United States Patent
Sakatani

(10) Patent No.: US 8,964,246 B2
(45) Date of Patent: Feb. 24, 2015

(54) IMAGE FORMING APPARATUS, IMAGE FORMING METHOD, IMAGE DENSITY MEASURING APPARATUS, AND IMAGE DENSITY MEASURING METHOD

(75) Inventor: Kazuomi Sakatani, Sagamihara (JP)

(73) Assignee: Konica Minolta, Inc, Chiyoda-Ku, Tokyo (JP)

( * ) Notice: Subject to any disclaimer, the term of this patent is extended or adjusted under 35 U.S.C. 154(b) by 675 days.

(21) Appl. No.: 13/221,672

(22) Filed: Aug. 30, 2011

(65) Prior Publication Data
US 2012/0050771 A1    Mar. 1, 2012

(30) Foreign Application Priority Data

Aug. 31, 2010  (JP) .................. 2010-193148
Aug. 31, 2010  (JP) .................. 2010-193150

(51) Int. Cl.
*H04N 1/60*    (2006.01)
*G03G 15/00*   (2006.01)
(Continued)

(52) U.S. Cl.
CPC ....... *H04N 1/00002* (2013.01); *G03G 15/0131* (2013.01); *G03G 15/5062* (2013.01);
(Continued)

(58) Field of Classification Search
None
See application file for complete search history.

(56) References Cited

U.S. PATENT DOCUMENTS 5,880,781 A * 3/1999 Udagawa et al. ............. 348/279
2005/0025509 A1* 2/2005 Ooki et al. .................... 399/49
(Continued)

FOREIGN PATENT DOCUMENTS

JP    5-153383      6/1993
JP    10-193689 A   7/1998
(Continued)

OTHER PUBLICATIONS

Office Action dated Jan. 21, 2014 issued in corresponding Japanese Patent Appln. No. 2010-193150, with English translation (6 pages).
(Continued)

*Primary Examiner* — Marivelisse Santiago Cordero
*Assistant Examiner* — Temitayo Folayan
(74) *Attorney, Agent, or Firm* — Buchanan Ingersoll & Rooney PC

(57) ABSTRACT

An image forming apparatus includes a control section extracting a color composition of each color ranging from a first to an $n^{th}$ color from input image data, on the color composition of an $m^{th}$ color, the m being 1 to n−1, performing a first and a second gamma corrections correcting a gradation of the color composition respectively based on a gamma curve for the $m^{th}$ color to obtain a first corrected gradation value, and based on a gamma curve for an $(m+1)^{th}$ color to obtain a second corrected gradation value, and interpolating the first and the second corrected gradation values to determine an output value for the color composition, on the color composition of the $n^{th}$ color, correcting a gradation of the color composition based on a gamma curve for the $n^{th}$ color to obtain an output value for the color composition.

14 Claims, 32 Drawing Sheets

(51) Int. Cl.
*G09G 5/02* (2006.01)
*B41J 29/393* (2006.01)
*H04N 9/04* (2006.01)
*H04N 1/00* (2006.01)
*G03G 15/01* (2006.01)

(52) U.S. Cl.
CPC ....... *H04N1/00015* (2013.01); *H04N 1/00023* (2013.01); *H04N 1/00031* (2013.01); *H04N 1/00045* (2013.01); *H04N 1/00053* (2013.01); *H04N 1/00063* (2013.01); *H04N 1/00068* (2013.01); *H04N 1/00087* (2013.01); *H04N 1/0009* (2013.01); *H04N 1/6033* (2013.01); *G03G 2215/0161* (2013.01); *H04N 2201/0006* (2013.01); *H04N 2201/044* (2013.01)
USPC ................ 358/1.9; 399/49; 345/590; 347/19; 348/279

(56) References Cited

U.S. PATENT DOCUMENTS

| | | | | |
|---|---|---|---|---|
| 2009/0040261 | A1* | 2/2009 | Zhang et al. | 347/19 |
| 2010/0214310 | A1* | 8/2010 | Kuwahara et al. | 345/590 |

FOREIGN PATENT DOCUMENTS

| | | |
|---|---|---|
| JP | 2004-021164 A | 1/2004 |
| JP | 2004-212893 | 7/2004 |
| JP | 2009-53307 A | 3/2009 |

OTHER PUBLICATIONS

Chinese Office Action dated Jul. 17, 2014 issued by the State Intellectual Property Office of People's Republic of China in corresponding Chinese Patent Appln. No. 20110261737 and an English translation thereof. (15 pages).

* cited by examiner

FIG.10

| OUTPUT COLOR | IMAGE DENSITY SIGNAL | INTERMEDIATE SIGNAL |
|---|---|---|
| Pb | RGB | Y |
| R | | |
| G | | |
| B | | |
| C | | R |
| M | | G |
| Y | | B |
| K | | G |

FIG.11

| GRADATION VALUE | TARGET | SAMPLE |
|---|---|---|
| 0 | 245.25 | 234.39 |
| 31 | 215.44 | 204.87 |
| 63 | 182.33 | 173.70 |
| 95 | 156.96 | 150.72 |
| 127 | 132.37 | 127.87 |
| 159 | 114.11 | 111.96 |
| 191 | 90.25 | 87.70 |
| 223 | 69.02 | 67.63 |
| 255 | 48.03 | 47.31 |

PAPER CONVEYING DIRECTION

FIG.20

| LIGHT SOURCE | RED | GREEN | BLUE |
|---|---|---|---|
| CENTER WAVELENGTH | 630nm | 530nm | 470nm |
| SUBJECT COLOR | CYAN | MAGENTA BLACK | YELLOW |

FIG.31

| LIGHT SOURCE | | RED | GREEN | BLUE |
|---|---|---|---|---|
| INPUT GRADATION | 255 | 24.7 | 25.7 | 23.1 |
| | 224 | 94.3 | 93.5 | 92.3 |
| | 192 | 129 | 128.7 | 130.4 |
| | 160 | 156.2 | 157.7 | 155.6 |
| | 128 | 180.8 | 182.9 | 180.8 |
| | 96 | 203 | 201.9 | 201.1 |
| | 64 | 220.1 | 222.2 | 219.4 |
| | 32 | 238.2 | 239.1 | 237.4 |

# IMAGE FORMING APPARATUS, IMAGE FORMING METHOD, IMAGE DENSITY MEASURING APPARATUS, AND IMAGE DENSITY MEASURING METHOD

BACKGROUND OF THE INVENTION

1. Field of the Invention

The present invention relates to an image forming apparatus, an image forming method, an image density measuring apparatus, and an image density measuring method.

2. Description of the Related Art

Conventionally, in the field of offset printing, there is known a technology by which color patches of seven solid colors of red (R), green (G), blue (B), cyan (C), magenta (M), yellow (Y), and black (K) are printed in a margin for cutting of paper as a control strip, and the color patches are measured by a density measurer, a colorimeter, or the like to adjust the amount of ink of each color.

On the other hand, in an image forming apparatus in which images are formed by an electrophotographic process, color patches of four solid colors of cyan (C), magenta (M), yellow (Y), and black (K) are outputted and measured, and, instead of adjusting the amount of ink, a process condition of an electronic potential for developing or the like is changed, in general. For example, the amount of charge onto an image holder or the amount of luminous energy onto the image holder is adjusted. Accordingly, color adjustment can be performed at the maximum density.

In general, when the process condition is changed as described above, gradation characteristics in a halftone are also changed. Therefore, after the process condition is changed, gradation images of the colors of C, M, Y, and K are outputted and measured, and gamma correction is performed.

However, in the color adjustment in the image forming apparatus using the conventional electrophotographic process, only the primary colors each of which is constituted of one color of C, M, Y, and K undergo the correction, and the secondary colors and the tertiary color each of which is constituted of two or more colors of C, M, Y, and K are merely corrected indirectly. As a matter of fact, even when the primary colors are corrected to have their ideal states, the secondary colors and the tertiary color cannot always have their ideal states. It depends on the status of the image forming apparatus in an image forming process such as image transfer to paper or image fixation to paper. Therefore, images cannot be stabilized by such color adjustment.

On the other hand, there is a technology by which a chart on which patch images of a thousand colors or a few thousand colors are formed is outputted, and each patch image is measured by an external device such as a color measuring device, and then, the primary, secondary, and tertiary colors are adjusted by generating color profiles based on the measurement result. However, it takes too much time and workload for a user to perform such color adjustment.

While such technologies are known, there is a color correcting apparatus described in Japanese Patent Application Laid-open Publication No. hei 5-153383, the color correcting apparatus in which density signals of C, M, and Y are separated into a black composition, a second color composition, and a primary color composition, each of the compositions is multiplied by a certain percentage so that the compositions are independently corrected, and then the corrected compositions are added up.

SUMMARY OF THE INVENTION

Although the workload of a user for color conversion is lightened by the technology described in Japanese Patent Application Laid-open Publication No. hei 5-153383, images are not stabilized because, by the technology, the compositions are independently and linearly corrected, and the corrected compositions are added up. That is, the technology cannot deal with the gamma correction which is a non-linear correction.

In view of the circumstances, the present invention is made, and objects of the present invention include providing an image forming apparatus, an image forming method, an image density measuring apparatus and an image density measuring method which can stabilize images at an ideal state in a simple manner.

In order to achieve at least one object described above, a first aspect of the present invention is an image forming apparatus including: an image forming section which forms an image on paper by mixing n color materials, the n being a positive integer, and which forms, on paper, a gradation pattern image including color patches each of which includes gradation patches, wherein the color patches have colors different from each other, the colors ranging from a first color constituted of one color material among the n color materials to an $n^{th}$ color constituted of the n color materials, and the gradation patches have gradations different from each other; a reflectance detection section which detects a reflectance of each of the gradation patches of each of the color patches included in the gradation pattern image formed on the paper, and outputs reflectance information on the detected reflectance; and a control section which creates a gamma curve for each of the colors ranging from the first color to the $n^{th}$ color based on the reflectance information on each of the gradation patches of each of the color patches, the reflectance information being outputted from the reflectance detection section, to correct a gradation of input image data in such a way as to obtain a predetermined reflectance, wherein the control section (i) extracts a color composition of each of the colors ranging from the first color to the $n^{th}$ color from the input image data, (ii) on the color composition of an $m^{th}$ color, the m being 1 to n−1, performs a first gamma correction which corrects the gradation of the color composition of the $m^{th}$ color based on the gamma curve for the $m^{th}$ color so as to obtain a first corrected gradation value, and a second gamma correction which corrects the gradation of the color composition of the $m^{th}$ color based on the gamma curve for an $(m+1)^{th}$ color so as to obtain a second corrected gradation value, and interpolates the first corrected gradation value and the second corrected gradation value so as to determine an output value for the color composition of the $m^{th}$ color, (iii) on the color composition of the $n^{th}$ color, corrects the gradation of the color composition of the $n^{th}$ color based on the gamma curve for the $n^{th}$ color so as to obtain an output value for the color composition of the $n^{th}$ color, and (iv) combines the output values of the colors ranging from the first color to the $n^{th}$ color so as to generate output image data, and the image forming section forms an image on paper based on the output image data generated by the control section.

Preferably, in the image forming apparatus, the control section extracts a luminance signal based on the reflectance information outputted from the reflectance detection section, the luminance signal being a composition representing brightness, and creates, based on the extracted luminance signal, the gamma curve for a color of the colors, the color being constituted of two or more color materials among the n color materials.

Preferably, in the image forming apparatus, the control section weights the first corrected gradation value and the second corrected gradation value in accordance with a ratio of the gradation of the color composition of the $(m+1)^{th}$ color to the gradation of the color composition of the $m^{th}$ color in interpolating the first corrected gradation value and the second corrected gradation value.

Preferably, in the image forming apparatus, when the color composition of the $(m+1)^{th}$ color constituted of two or more colors including the $m^{th}$ color is not extracted from the input image data, the control section corrects the gradation of the color composition of the $m^{th}$ color based on the gamma curves for the $(m+1)^{th}$ colors each of which is constituted of two or more colors including the $m^{th}$ color so as to obtain pre-second corrected gradation values, and averages the obtained pre-second corrected gradation values so as to obtain the second corrected gradation value.

Preferably, in the image forming apparatus, the n color materials are three toner materials of cyan, magenta, and yellow.

Preferably, in the image forming apparatus, the image forming section forms, on the paper, the gradation pattern image including the color patches which are a cyan color patch constituted of cyan, a magenta color patch constituted of magenta, a yellow color patch constituted of yellow, and a mixed color patch constituted of two or more colors among cyan, magenta, and yellow, the reflectance detection section includes: a first reading section which emits red light to a color patch of the color patches, the color patch passing through a first reading position, receives reflected light of the red light reflected by the color patch, and outputs a first signal corresponding to an amount of the received light; a second reading section which emits green light to a color patch of the color patches, the color patch passing through a second reading position different from the first reading position at least in a main-scanning direction for the paper, receives reflected light of the green light reflected by the color patch, and outputs a second signal corresponding to an amount of the received light; and a third reading section which emits blue light to a color patch of the color patches, the color patch passing through a third reading position different from the first reading position and the second reading position at least in the main-scanning direction for the paper, receives reflected light of the blue light reflected by the color patch, and outputs a third signal corresponding to an amount of the received light, the control section obtains the first signal, the second signal, and the third signal respectively outputted from the first reading section, the second reading section, and the third reading section as the reflectance information, the image forming section forms, on the paper, the cyan color patch, the magenta color patch, and the yellow color patch in such a way as to respectively pass through the first reading position, the second reading position, and the third reading position, and forms, on the paper, the mixed color patch in such a way as to pass through the first reading position, the second reading position, and the third reading position, and the control section obtains the reflectance information on the cyan color patch from the first signal outputted from the first reading section, the reflectance information on the magenta color patch from the second signal outputted from the second reading section, the reflectance information on the yellow color patch from the third signal outputted from the third reading section, and the reflectance information on the mixed color patch from the first signal, the second signal, and the third signal respectively outputted from the first reading section, the second reading section, and the third reading section.

Preferably, in the image forming apparatus, the image forming section forms, on the paper, the gradation pattern image including the color patches which are a cyan color patch constituted of cyan, a magenta color patch constituted of magenta, a yellow color patch constituted of yellow, and a mixed color patch constituted of two or more colors among cyan, magenta, and yellow, the reflectance detection section includes: a first reading section which emits red light to a color patch of the color patches, the color patch passing through a first reading position, receives reflected light of the red light reflected by the color patch, and outputs a first signal corresponding to an amount of the received light; a second reading section which emits green light to a color patch of the color patches, the color patch passing through a second reading position identical with the first reading position in a main-scanning direction for the paper and different from the first reading position in a sub-scanning direction for the paper, receives reflected light of the green light reflected by the color patch, and outputs a second signal corresponding to an amount of the received light; and a third reading section which emits blue light to a color patch of the color patches, the color patch passing through a third reading position identical with the first reading position and the second reading position in the main-scanning direction for the paper and different from the first reading position and the second reading position in the sub-scanning direction for the paper, receives reflected light of the blue light reflected by the color patch, and outputs a third signal corresponding to an amount of the received light, the control section obtains the first signal, the second signal, and the third signal respectively outputted from the first reading section, the second reading section, and the third reading section as the reflectance information, the image forming section forms, on the paper, the cyan color patch, the magenta color patch, the yellow color patch, and the mixed color patch in such a way that each of the color patches passes through the first reading position, the second reading position, and the third reading position, and the control section obtains the reflectance information on the cyan color patch from the first signal outputted from the first reading section, the reflectance information on the magenta color patch from the second signal outputted from the second reading section, the reflectance information on the yellow color patch from the third signal outputted from the third reading section, and the reflectance information on the mixed color patch from the first signal, the second signal, and the third signal respectively outputted from the first reading section, the second reading section, and the third reading section.

In order to achieve at least one object described above, a second aspect of the present invention is an image forming method including: forming an image on paper by mixing n color materials, the n being a positive integer, and forming, on paper, a gradation pattern image including color patches each of which includes gradation patches, wherein the color patches have colors different from each other, the colors ranging from a first color constituted of one color material among the n color materials to an $n^{th}$ color constituted of the n color materials, and the gradation patches have gradations different from each other; detecting a reflectance of each of the gradation patches of each of the color patches included in the gradation pattern image formed on the paper, and obtaining reflectance information on the detected reflectance; and creating a gamma curve for each of the colors ranging from the first color to the $n^{th}$ color based on the reflectance information on each of the gradation patches of each of the color patches, the reflectance information being outputted from the reflectance detection section, to correct a gradation of input image data in such a way as to obtain a predetermined reflectance, wherein in the creating, (i) a color composition of each of the colors ranging from the first color to the $n^{th}$ color is extracted from the input image data, (ii) on the color composition of an $m^{th}$ color, the m being 1 to n−1, a first gamma correction and a second gamma correction are performed, the first gamma correction which corrects the gradation of the color composition of the $m^{th}$ color based on the gamma curve for the $m^{th}$ color so as to obtain a first corrected gradation value, and the second gamma correction which corrects the gradation of the color composition of the $m^{th}$ color based on the gamma curve for an $(m+1)^{th}$ color so as to obtain a second corrected gradation value, and the first corrected gradation value and the second corrected gradation value are interpolated so as to determine an output value for the color composition of the $m^{th}$ color, (iii) on the color composition of the $n^{th}$ color, the gradation of the color composition of the $n^{th}$ color is corrected based on the gamma curve for the $n^{th}$ color so as to obtain an output value for the color composition of the $n^{th}$ color, and (iv) the output values of the colors ranging from the first color to the $n^{th}$ color are combined so as to generate output image data, and in the forming, an image is formed on paper based on the output image data generated in the creating.

Preferably, in the image forming method, in the creating, a luminance signal is extracted based on the reflectance information obtained in the detecting, the luminance signal being a composition representing brightness, and, based on the extracted luminance signal, the gamma curve for a color of the colors is created, the color being constituted of two or more color materials among the n color materials.

Preferably, in the image forming method, in the creating, the first corrected gradation value and the second corrected gradation value are weighted in accordance with a ratio of the gradation of the color composition of the $(m+1)^{th}$ color to the gradation of the color composition of the $m^{th}$ color in interpolating the first corrected gradation value and the second corrected gradation value.

Preferably, in the image forming method, in the creating, when the color composition of the $(m+1)^{th}$ color constituted of two or more colors including the $m^{th}$ color is not extracted from the input image data, the gradation of the color composition of the $m^{th}$ color is corrected based on the gamma curves for the $(m+1)^{th}$ colors each of which is constituted of two or more colors including the $m^{th}$ color so as to obtain pre-second corrected gradation values, and the obtained pre-second corrected gradation values are averaged so as to obtain the second corrected gradation value.

Preferably, in the image forming method, the n color materials are three toner materials of cyan, magenta, and yellow.

Preferably, in the image forming method, in the creating, the gradation pattern image is formed on the paper, the gradation pattern image including the color patches which are a cyan color patch constituted of cyan, a magenta color patch constituted of magenta, a yellow color patch constituted of yellow, and a mixed color patch constituted of two or more colors among cyan, magenta, and yellow, the detecting includes: a first reading in which red light is emitted to a color patch of the color patches, the color patch passing through a first reading position, reflected light of the red light reflected by the color patch is received, and a first signal corresponding to an amount of the received light is obtained; a second reading in which green light is emitted to a color patch of the color patches, the color patch passing through a second reading position different from the first reading position at least in a main-scanning direction for the paper, reflected light of the green light reflected by the color patch is received, and a second signal corresponding to an amount of the received light is obtained; and a third reading in which blue light is emitted to a color patch of the color patches, the color patch passing through a third reading position different from the first reading position and the second reading position at least in the main-scanning direction for the paper, reflected light of the blue light reflected by the color patch is received, and a third signal corresponding to an amount of the received light is obtained, in the creating, the first signal, the second signal, and the third signal respectively obtained in the first reading, the second reading, and the third reading are obtained as the reflectance information, in the forming, the cyan color patch, the magenta color patch, and the yellow color patch are formed on the paper in such a way as to respectively pass through the first reading position, the second reading position, and the third reading position, and the mixed color patch is formed on the paper in such a way as to pass through the first reading position, the second reading position, and the third reading position, and in the creating, the reflectance information on the cyan color patch is obtained from the first signal obtained in the first reading, the reflectance information on the magenta color patch is obtained from the second signal obtained in the second reading, the reflectance information on the yellow color patch is obtained from the third signal obtained in the third reading, and the reflectance information on the mixed color patch is obtained from the first signal, the second signal, and the third signal respectively obtained in the first reading, the second reading, and the third reading.

Preferably, in the image forming method, in the forming, the gradation pattern image is formed on the paper, the gradation pattern image including the color patches which are a cyan color patch constituted of cyan, a magenta color patch constituted of magenta, a yellow color patch constituted of yellow, and a mixed color patch constituted of two or more colors among cyan, magenta, and yellow, the detecting includes: a first reading in which red light is emitted to a color patch of the color patches, the color patch passing through a first reading position, reflected light of the red light reflected by the color patch is received, and a first signal corresponding to an amount of the received light is obtained; a second reading in which green light is emitted to a color patch of the color patches, the color patch passing through a second reading position identical with the first reading position in a main-scanning direction for the paper and different from the first reading position in a sub-scanning direction for the paper, reflected light of the green light reflected by the color patch is received, and a second signal corresponding to an amount of the received light is obtained; and a third reading in which blue light is emitted to a color patch of the color patches, the color patch passing through a third reading position identical with the first reading position and the second reading position in the main-scanning direction for the paper and different from the first reading position and the second reading position in the sub-scanning direction for the paper, reflected light of the blue light reflected by the color patch is received, and a third signal corresponding to an amount of the received light is obtained, in the creating, the first signal, the second signal, and the third signal respectively obtained in the first reading, the second reading, and the third reading are obtained as the reflectance information, in the forming, the cyan color patch, the magenta color patch, the yellow color patch, and the mixed color patch are formed on the paper in such a way that each of the color patches passes through the first reading position, the second reading position, and the third reading position, and in the creating, the reflectance information on the cyan color patch is obtained from the first signal obtained in the first reading, the reflectance information on the magenta color patch is obtained from the second signal obtained in the second reading, the reflectance information on the yellow color patch is obtained from the third signal obtained in the third reading, and the reflectance information on the mixed color patch is obtained from the first signal, the second signal, and the third signal respectively obtained in the first reading, the second reading, and the third reading.

In order to achieve at least one object described above, a third aspect of the present invention is an image density measuring apparatus including: a first reading section which emits red light to a color patch, receives reflected light of the red light reflected by the color patch, and outputs a first signal corresponding to an amount of the received light, so as to read the color patch including a cyan color patch constituted of cyan and a mixed color patch constituted of two or more colors among cyan, magenta, and yellow; a second reading section which emits green light to a color patch, receives reflected light of the green light reflected by the color patch, and outputs a second signal corresponding to an amount of the received light, so as to read the color patch including a magenta color patch constituted of magenta and the mixed color patch; and a third reading section which emits blue light to a color patch, receives reflected light of the blue light reflected by the color patch, and outputs a third signal corresponding to an amount of the received light, so as to read the color patch including a yellow color patch constituted of yellow and the mixed color patch; and a density information obtaining section which obtains reflectance information on each of the color patches from the first signal, the second signal, and the third signal respectively outputted from the first reading section, the second reading section, and the third reading section, wherein the first reading section, the second reading section, and the third reading section read the color patches at positions different from each other.

In order to achieve at least one object described above, a fourth aspect of the present invention is an image density measuring method including: first reading in which red light is emitted to a color patch, reflected light of the red light reflected by the color patch is received, and a first signal corresponding to an amount of the received light is obtained, so as to read the color patch including a cyan color patch constituted of cyan and a mixed color patch constituted of two or more colors among cyan, magenta, and yellow; second reading in which green light is emitted to a color patch, reflected light of the green light reflected by the color patch is received, and a second signal corresponding to an amount of the received light is obtained, so as to read the color patch including a magenta color patch constituted of magenta and the mixed color patch; and third reading in which blue light is emitted to a color patch, reflected light of the blue light reflected by the color patch is received, and a third signal corresponding to an amount of the received light is obtained, so as to read the color patch including a yellow color patch constituted of yellow and the mixed color patch; and obtaining reflectance information on each of the color patches from the first signal, the second signal, and the third signal respectively obtained in the first reading, the second reading, and the third reading, wherein the reading of the color patch in the first reading, the reading of the color patch in the second reading, and the reading of the color patch in the third reading are performed at positions different from each other.

BRIEF DESCRIPTION OF THE DRAWINGS

The present invention is fully understood from the detailed description given hereinbelow and the accompanying drawings, which are given by way of illustration only, and thus are not intended as limits of the present invention, wherein:

FIG. 10 is a table for explaining intermediate signals;

FIG. 11 is a table for explaining gamma values to gradation values;

FIG. 20 is a table for explaining center wavelengths of light emitting devices;

FIG. 31 is a table for explaining a relationship between input gradations of neutral grey and output values of single-color density sensors.

DESCRIPTION OF THE PREFERRED EMBODIMENT

Hereinafter, embodiments of the present invention are described in detail referring to the accompanying drawings. However, the scope of the present invention is not limited to the drawings.

[First Embodiment]

Figure 1:
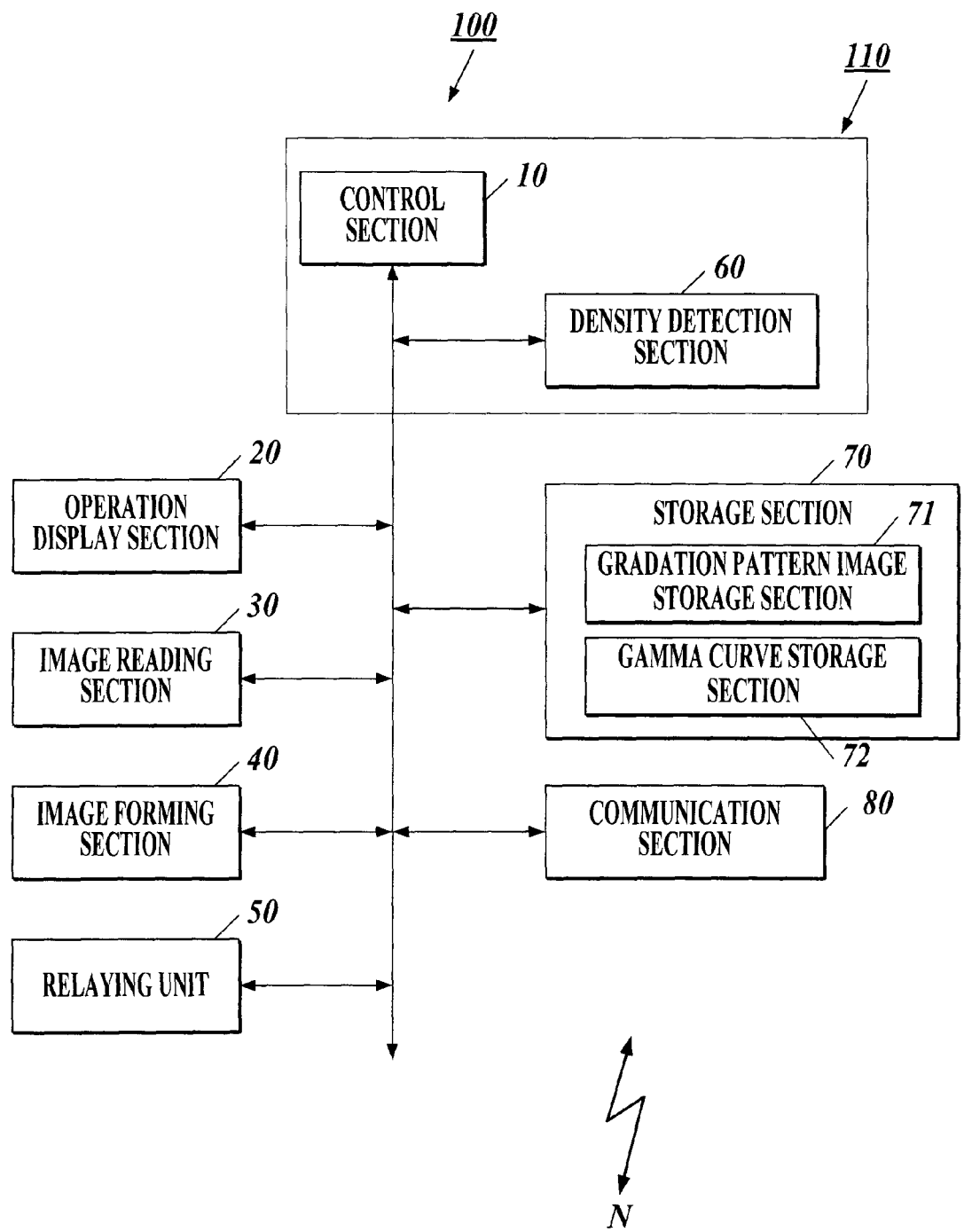
FIG. 1 is a block diagram showing a functional configuration of an image forming apparatus according to a first embodiment of the present invention.

FIG. 1 shows a functional configuration of an image forming apparatus 100 according to a first embodiment of the present invention. The image forming apparatus 100 is a multifunctional machine having a copying function, an image reading function, a printing function, and the like, and is a color image forming apparatus using an electrophotographic process.

As shown in FIG. 1, the image forming apparatus 100 includes a control section 10 (density information obtaining section), an operation display section 20, an image reading section 30, an image forming section 40, a relaying unit 50, a density detection section 60 (reflectance detection section), a storage section 70, and a communication section 80. These sections and the like are connected by a bus.

The control section 10 includes a CPU (Central Processing Unit), a ROM (Read Only Memory), and a RAM (Random Access Memory). The CPU reads a system program or various process programs stored in the ROM in response to operation signals inputted from the operation display section 20 or command signals received by the communication section 80. The control section 10 expands the read program in the RAM, and performs centralized control of operations of the sections and the like of the image forming apparatus 100 in accordance with the expanded program.

The operation display section 20 is constituted of an LCD (Liquid Crystal Display), and displays various operation buttons, the status of the image forming apparatus 100, the operation status of each functions thereof, and the like on a display screen of the operation display section 20 in accordance with instructions of display signals inputted from the control section 10. The display screen of the LCD is covered with a pressure-sensitive (resistive film type) touch panel in which transparent electrodes are disposed in a lattice. A position coordinate pressed with a finger or a stylus is detected as a voltage value, and the detected position coordinate (position signal) is outputted to the control section 10 as an operation signal. The operation display section 20 includes various operation buttons such as number buttons and a start button, and outputs the operation signals to the control section 10 when the buttons are operated.

The image reading section 30 includes a scanner under a contact glass to place documents, and reads images on the documents. The scanner includes a light source, a CCD (Charge Coupled Device) image sensor, and an A/D converter. The scanner performs photoelectric conversion of reflected light of light which is emitted from the light source to the documents so as to scan the documents, thereby reading the images on the documents as R, G, and B signals, and performs A/D conversion of the read images, thereby generating image data.

The image forming section 40 forms images on paper based on yellow (Y), magenta (M), cyan (C), and black (K) image data by the electrophotographic process.

Figure 2:
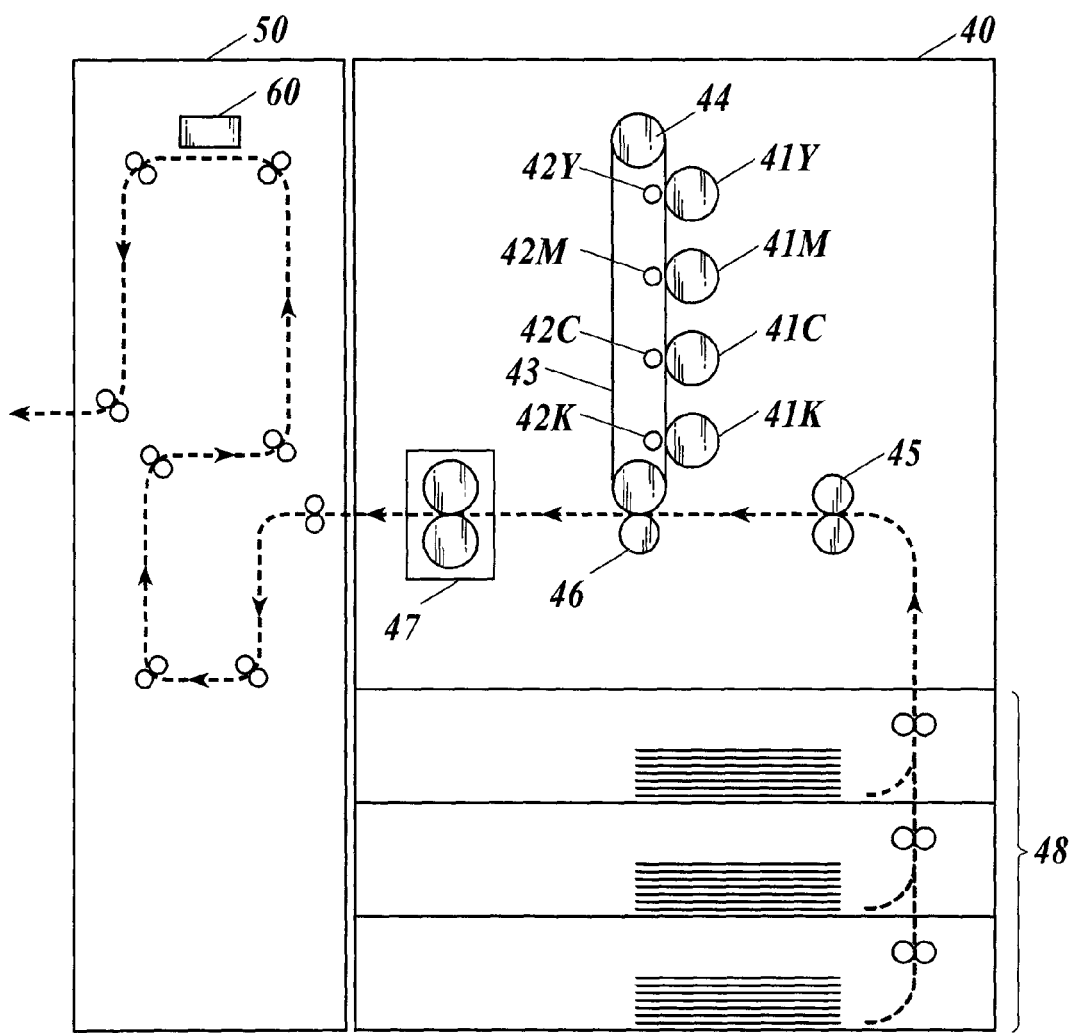
FIG. 2 is a schematic sectional view of an image forming section and a relaying unit of the image forming apparatus.

As shown in FIG. 2, the image forming section 40 includes photosensitive drums 41Y, 41M, 41C, and 41K, primary transfer rollers 42Y, 42M, 42C, and 42K, an intermediate transfer belt 43, rollers 44, resist rollers 45, a secondary roller 46, a fixation unit 47, and a paper feeding section 48.

Here, image formation at the image forming section 40 is described.

The photosensitive drum 41Y rotates, the surface thereof is charged by a charger (not shown), and a latent image of Y image data is formed on the charged part by exposure of a laser light source (not shown) or the like. Then, a yellow toner image is formed on the part by a developer (not shown), the part where the latent image is formed. The toner image is transferred to the intermediate transfer belt 43 by pressure from the primary transfer roller 42Y. The toner image becomes a yellow image corresponding to the image data to be outputted. The toners which are not transferred to the intermediate transfer belt 43 are removed by a cleaner (not shown).

Similarly, magenta, cyan, and black toner images are formed and transferred.

The intermediate transfer belt 43 rotates by the rotations of the rollers 44 and the primary transfer rollers 42Y, 42M, 42C, and 42K, and the Y, M, C, and K toner images are transferred to the intermediate transfer belt 43 so as to be superposed thereon in order. The paper feeding section 48 includes a plurality of paper feeding trays, and supplies paper stored in the paper feeding trays to the image forming section 40. The paper supplied from the paper feeding trays of the paper feeding section 48 is conveyed to the secondary transfer roller 46 by the rotation of the resist rollers 45.

When the resist rollers 45 and the secondary transfer roller 46 rotate, the paper passes through a nip part of the secondary transfer roller 46, whereby the Y, M, C, and K toner images on the intermediate transfer belt 43 are transferred to the paper. The paper to which the Y, M, C, and K toner images are transferred passes through the fixation unit 47. By pressurization and heating with the fixation unit 47, the Y, M, C, and K toner images are fixed to the paper, and consequently, a color image is formed. The paper on which the color image is formed is ejected to the relaying unit 50.

In a case of duplex printing, paper having an image formed on one side is reversed by a reversing-conveying unit (not shown), and is conveyed to the secondary transfer roller 46 by the resist rollers 45 so that an image is formed on the other side of the paper.

The relaying unit 50 receives the paper ejected from the image forming section 40, and has a function to send out the paper to have the paper undergone a next process. The relaying unit 50 includes the density detection section 60 on a path from the image forming section 40 to the exit for the paper from the relaying unit 50. The relaying unit 50 may have a function as a finisher to perform punching, folding, cutting, or the like.

The density detection section 60 outputs a voltage value as an image density signal to the control section 10. The voltage value corresponds to the density of each gradation patch of each color patch of a gradation pattern image formed on and fixed to the paper by the image forming section 40.

The control section 10 detects the density of each gradation patch thereof based on the voltage value outputted from the density detection section 60.

Figure 3A:
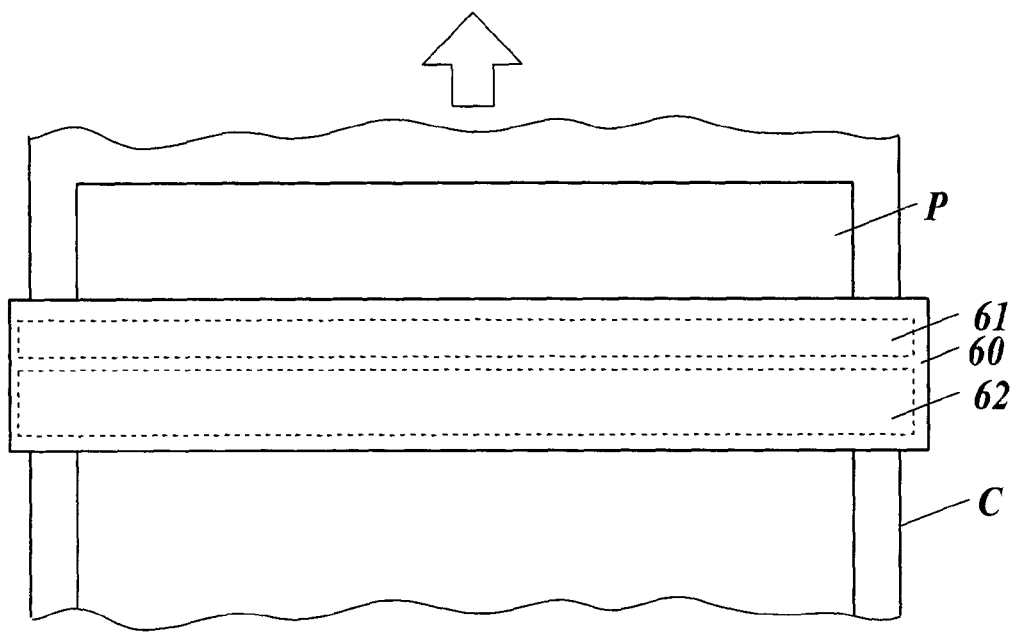
FIG. 3A is an enlarged plan view showing a schematic configuration of a density detection section of the image forming apparatus.
Figure 3B:
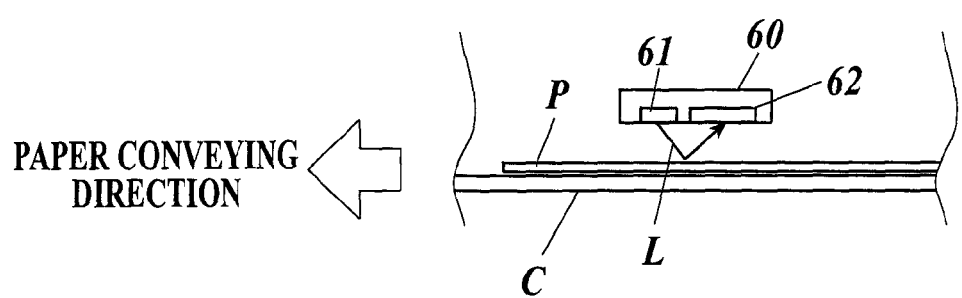
FIG. 3B is a lateral view showing the schematic configuration of the density detection section.

FIGS. 3A and 3B show a schematic configuration of the density detection section 60. FIG. 3A is an enlarged plan view of the density detection section 60 disposed above a conveyance path C, and FIG. 3B is a schematic lateral view thereof.

As shown in FIGS. 3A and 3B, the density detection section 60 includes a light source 61 and a CCD 62. As the light source 61, an LED (Light Emitting Diode) or a CCFL (Cold Cathode Fluorescent Lamp) can be used, for example. Light L emitted from the light source 61 is reflected by each gradation patch of each color patch of the gradation pattern image formed on paper P, and enters the CCD 62. That is, the light L enters the CCD 62, whereby the CCD 62 performs scans, the light L which is reflected by each gradation patch of each color patch of the gradation pattern image.

The CCD 62 is configured in such a way as to be longer than the width of the paper P conveyed on the conveyance path C so as to be able to read the entire image formed on the paper P in a main-scanning direction (vertical to a paper conveying direction shown in FIG. 3A) at one time.

The light L entering the CCD 62 is photoelectrically converted. Based thereon, the density detection section 60 determines a reflectance which is a ratio of the amount of light received by the CCD 62 to the amount of light emitted from the light source 61. The density detection section 60 generates the image density signal (reflectance information) from the reflectance as a measurement result, and outputs the image density signal to the control section 10. The image density signal determines the gradation of each of colors of red, green, and blue. The image density signal may be generated from the amount of the received light obtained by the photoelectric conversion. Furthermore, the density detection section 60 may output information showing the amount of the received light obtained by the photoelectric conversion to the control section 10, and the reflectance may be obtained at the control section 10.

After the gradation pattern image is scanned as described above, the control section 10 creates a gamma curve as described below based on image density signals outputted from the density detection section 60.

In the embodiment, instead of the CCD 62, another light emitting device which can receive light reflected by the gradation pattern image, and perform photoelectric conversion on the light may be used. In this case, light emitting devices may be arranged in a line in the main-scanning direction, or one or more light emitting device may be arranged in such a way as to scan the gradation pattern image in the main-scanning direction successively. Furthermore, although the CCD 62 performs scans at a position which is away from the paper in the embodiment, a contact optical reading device such as a CIS (Contact Image Sensor) may be used, instead.

Furthermore, a reference plate which can be read by the CCD 62 may be provided, and shading correction may be performed.

The storage section 70 is constituted of a hard disk, a flash memory, or the like, and stores various data. The storage section 70 includes a gradation pattern image storage section 71, a gamma curve storage section 72, and the like.

The gradation pattern image storage section 71 stores Y, M, C, K, R, G, B, and Pb data to form a gradation pattern image which includes a plurality of color patches each of which includes a plurality of gradation patches having densities/gradations different from each other. R (red) is a red color as a secondary color generated by mixing two color materials of magenta and yellow. G (green) is a green color as a secondary color generated by mixing two color materials of cyan and yellow. B (blue) is a blue color as a secondary color generated by mixing two color materials of cyan and magenta. Pb (process black) is a black color as a tertiary color generated by mixing three color materials of cyan, magenta, and yellow.

Here, a gradation pattern image is described referring to FIGS. 4 to 9.

The gradation pattern image formed on the paper P includes a plurality of color patches of eight colors of Y, M, C, K, R, G, B, and Pb, the color patches each of which has a plurality of gradation patches having densities/gradations ranging from the minimum density (gradation value 31) to the maximum density (gradation value 255). For example, the gradation values of the gradation patches of each color patch included in the gradation pattern image are 31, 63, 95, 127, 159, 191, 223, and 225. The gradation pattern images shown in FIGS. 4 to 9 are only examples, and hence the arrangement of the color patches and the arrangement of the gradation patches of each color patch are not limited thereto. Furthermore, as long as one of the gradation pattern images shown in FIGS. 4 to 9 is outputted, it is enough. However, a plurality of the gradation pattern images may be outputted and a combination thereof may be used.

Figure 4:
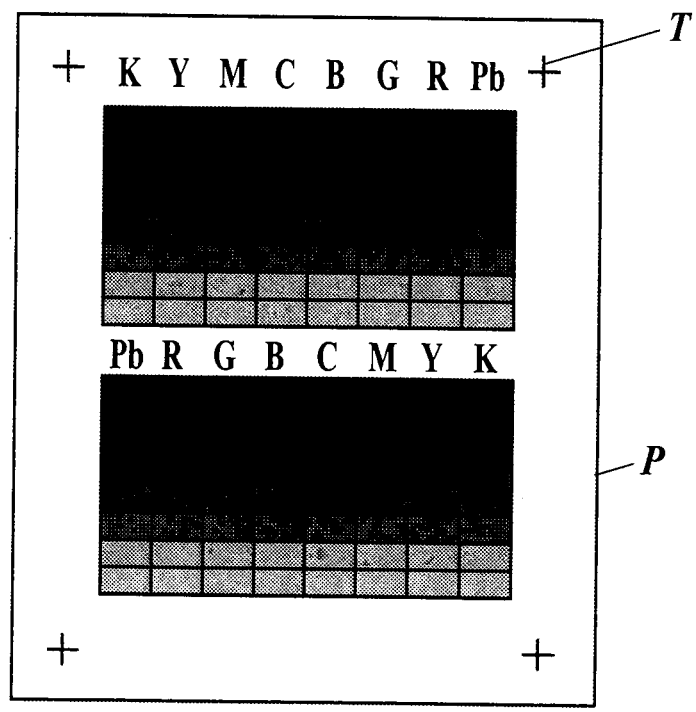
FIG. 4 shows a gradation pattern image.

In the gradation pattern image shown in FIG. 4, K, Y, M, C, B, G, R, and Pb color patches are formed in the order named from the left at the upper part of the paper. A mirror image thereof is formed at the lower part of the paper, the mirror image in which the color patches formed at the upper part thereof are reversed by taking a vertical direction as an axis. That is, Pb, R, G, B, C, M, Y, and K color patches are formed in the order named from the left at the lower part of the paper. By forming such a gradation pattern image, a gamma curve for each color can be created by averaging, gradation by gradation, the detected densities of the color patches of the same color, and hence the influence from the non-uniformity in a print area of the photosensitive drum 41, namely, the non-uniformity in a print area of the paper P, can be reduced. The gradation pattern image shown in FIG. 4 is arranged inside four trim marks T which are respectively arranged at the four corners of the paper P. The trim marks T are information showing cut positions of the paper P in bookbinding or the like. By forming the gradation pattern image inside the trim marks T, the paper P becomes a waste sheet. However, since the color patches can be formed in a large area, the number of sheets of paper necessary to form the gradation pattern image can be reduced. Furthermore, in the embodiment, in order to easily detect the start position of the gradation pattern image, the gradation patches of each color patch are formed in descending order of density/gradation.

Figure 5:
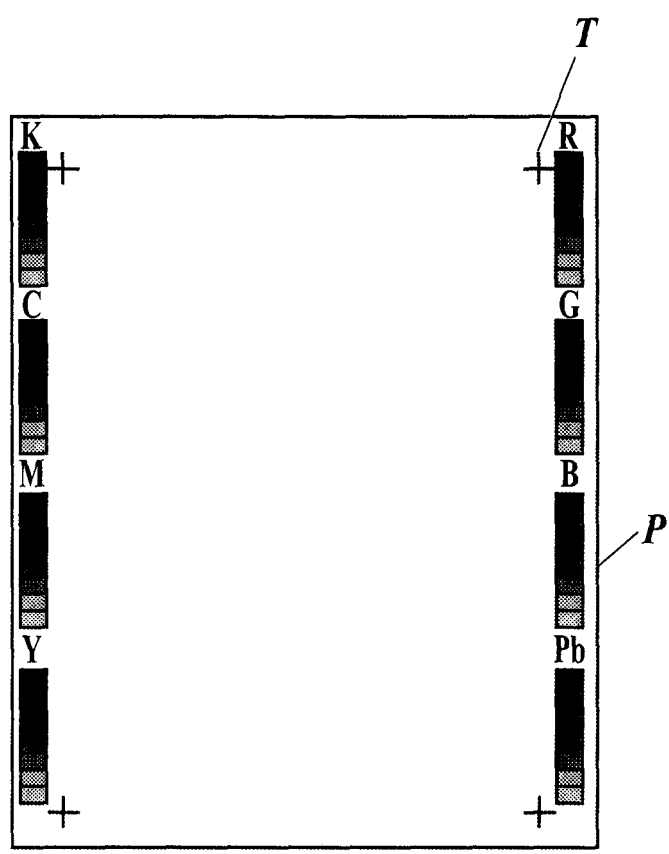
FIG. 5 shows another gradation pattern image.

The gradation pattern image shown in FIG. 5 is formed at the right and left end parts of the paper P, and outside the trim marks T. That is, K, C, M, and Y color patches are vertically arranged in the order named from the top at the left end part of the paper P, and R, G, B, and Pb color patches are vertically arranged in the order named from the top at the right end part thereof. In this case, when the paper P is cut by taking the trim marks T as references, the gradation pattern image is also cut off, and consequently, the paper P does not become a waste sheet, and costs can be reduced. Furthermore, in this case as well, in order to easily detect the start position of the gradation pattern image, the gradation patches of each color patch are formed in descending order of density/gradation.

Figure 6:
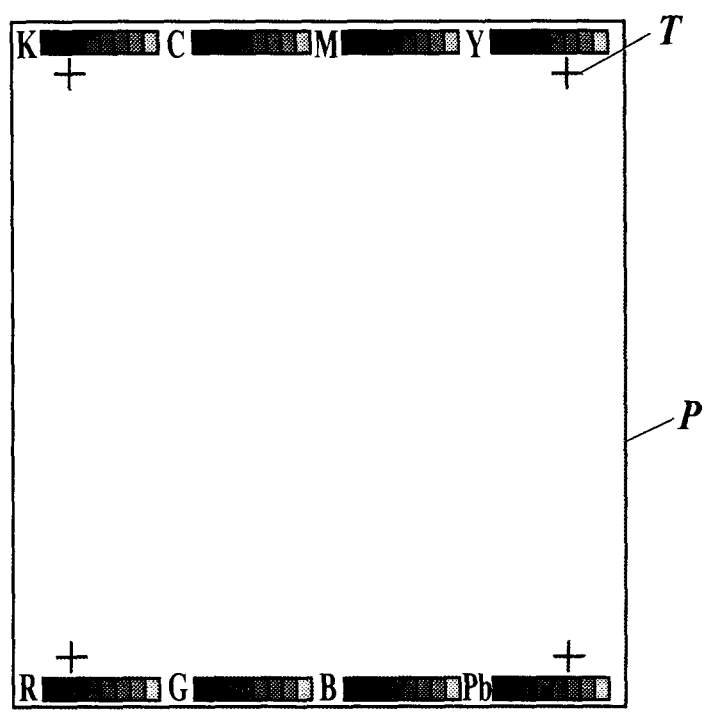
FIG. 6 shows another gradation pattern image.

The gradation pattern image shown in FIG. 6 is formed at the upper and lower end parts of the paper P, and outside the trim marks T. That is, K, C, M, and Y color patches are horizontally arranged in the order named from the left at the upper end part of the paper P, and R, G, B, and Pb color patches are horizontally arranged in the order named from the left at the lower end part thereof. In this case as well, when the paper P is cut by taking the trim marks T as references, the gradation pattern image is also cut off, and consequently, the paper P does not become a waste sheet, and costs can be reduced.

Figure 7:
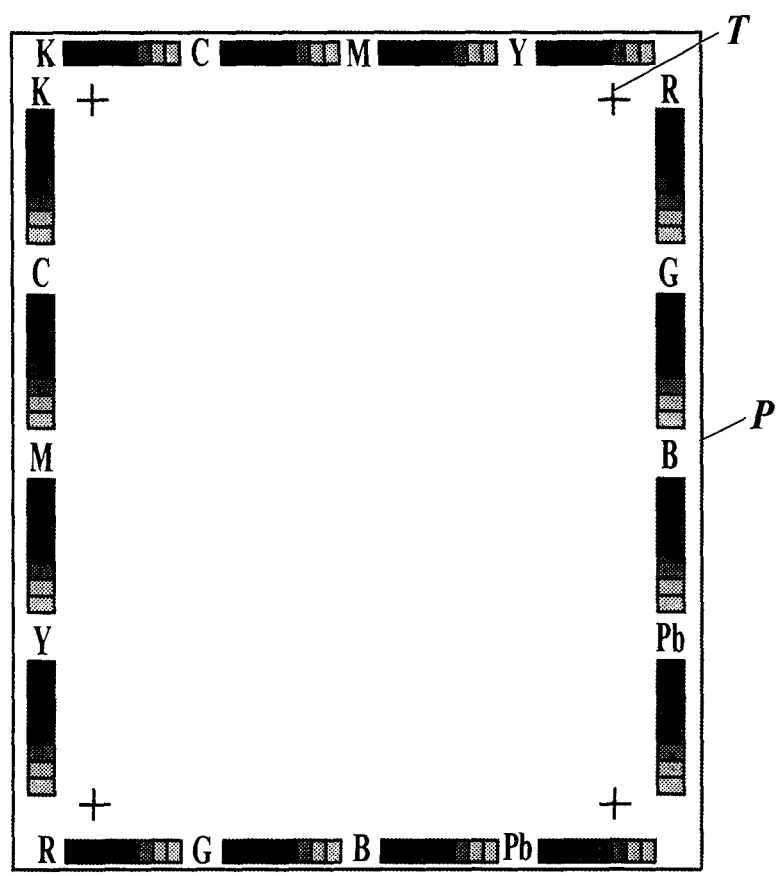
FIG. 7 shows another gradation pattern image.

The gradation pattern image shown in FIG. 7 is formed at the upper, lower, left, and right end parts of the paper P, and outside the trim marks T. That is, K, C, M, and Y color patches are vertically arranged in the order named from the top at the left end part of the paper P, and R, G, B, and Pb color patches are vertically arranged in the order named from the top at the right end part thereof. In addition, K, C, M, and Y color patches are horizontally arranged in the order named from the left at the upper end part of the paper P, and R, G, B, and Pb color patches are horizontally arranged in the order named from the left at the lower end part thereof. In this case as well, when the paper P is cut by taking the trim marks T as references, the gradation pattern image is also cut off, and consequently, the paper P does not become a waste sheet, and costs can be reduced. In addition, by forming such a gradation pattern image, a gamma curve for each color can be created by averaging, gradation by gradation, the detected densities of the color patches of the same color, and hence the influence from the non-uniformity in a print area of the photosensitive drum 41, namely, the non-uniformity in a print area of the paper P, can be reduced.

Figure 8:
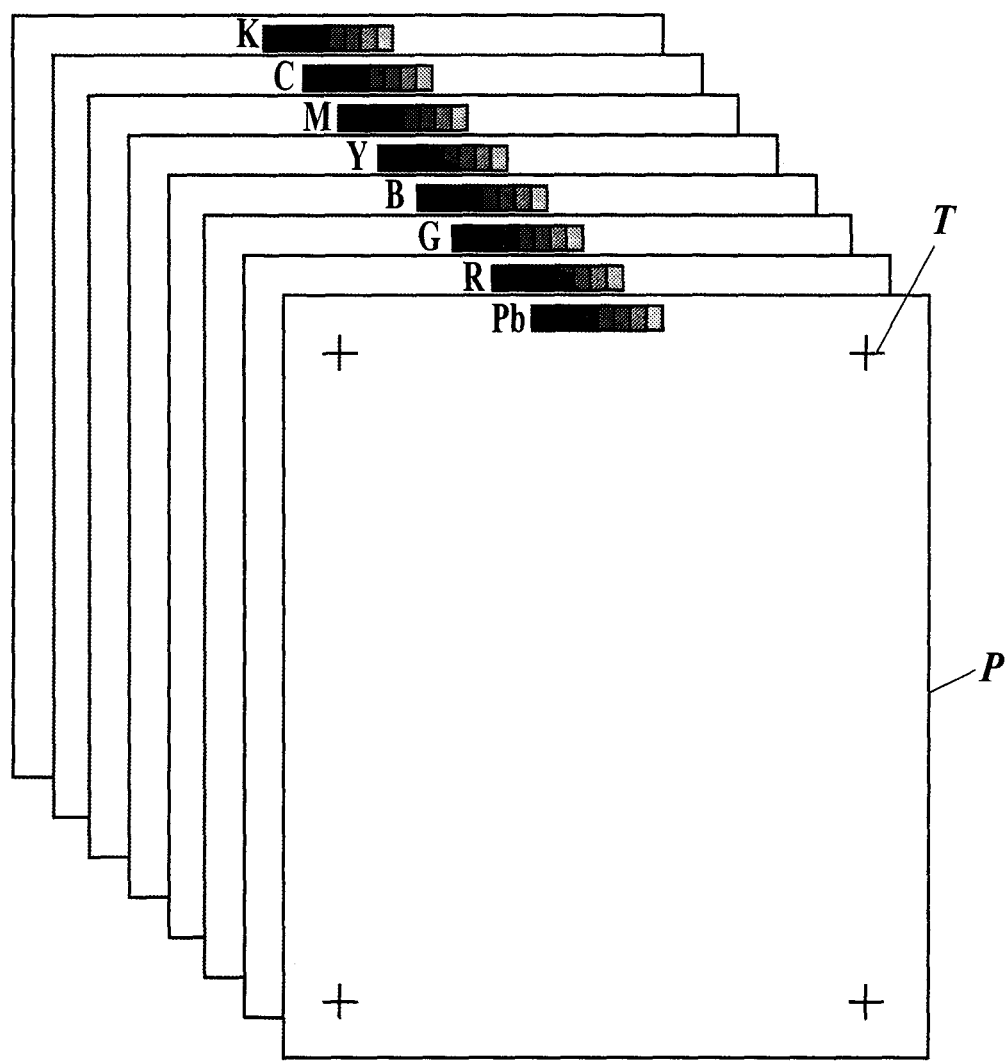
FIG. 8 shows another gradation pattern image.

The gradation pattern image shown in FIG. 8 is formed at the upper end part of the paper P, and outside the trim marks T. In this case, one color patch is formed horizontally long on one sheet of the paper P, and the density detection is performed by using a plurality of sheets of paper P. However, when the paper P is cut by taking the trim marks T as references, the gradation pattern image is also cut off, and consequently, the sheets of the paper P do not become waste sheets, and costs can be reduced. The position to form each color patch of the gradation pattern image is not limited to the position described above.

Figure 9:
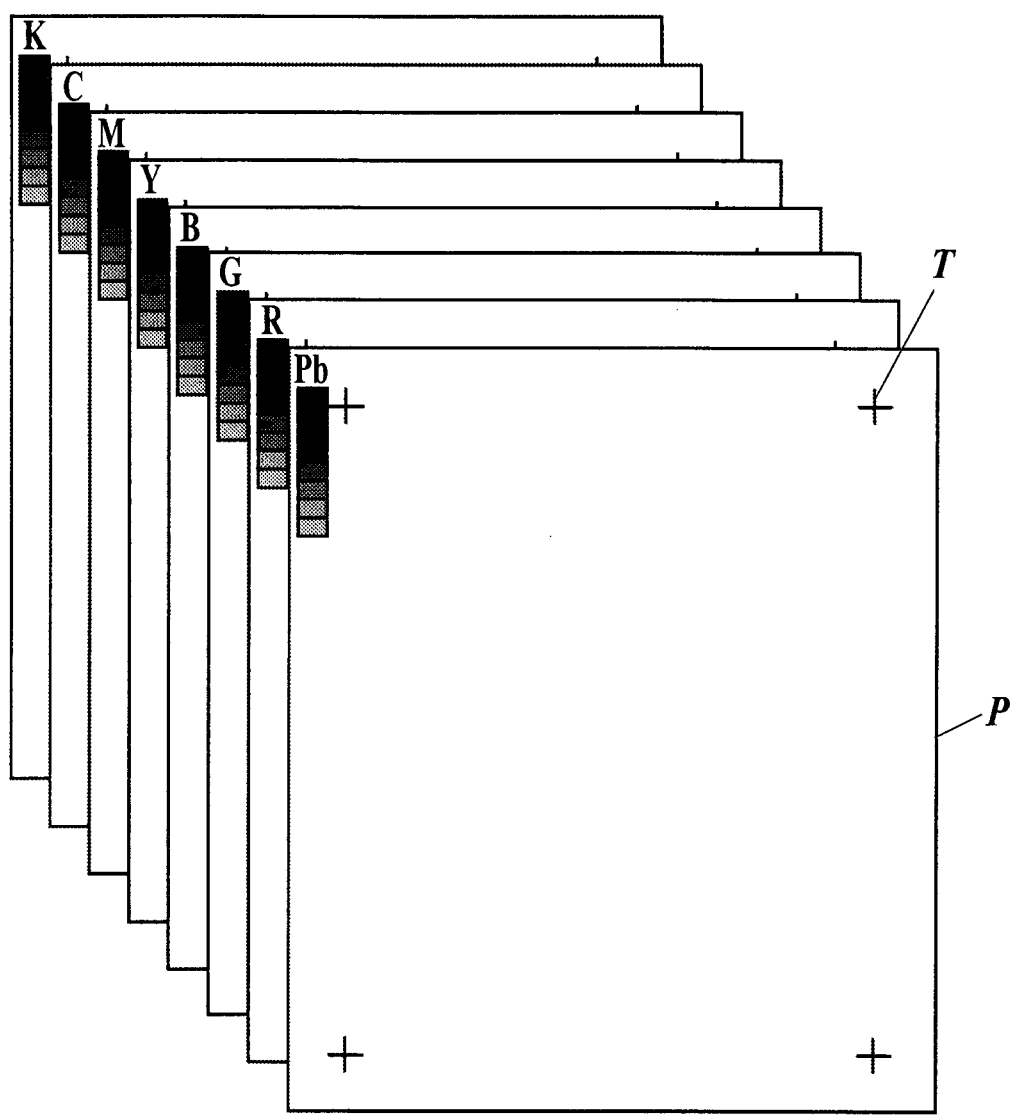
FIG. 9 shows another gradation pattern image.

The gradation pattern image shown in FIG. 9 is formed at the upper-left end part of the paper P, and outside the trim marks T. In this case, one color patch is formed vertically long on one sheet of the paper P, and the density detection is performed by using a plurality of sheets of paper P. However, when the paper P is cut by taking the trim marks T as references, the gradation pattern image is also cut off, and consequently, the sheets of the paper P do not become waste sheets, and costs can be reduced. The position to form each color patch of the gradation pattern image is not limited to the position described above.

The gamma curve storage section 72 stores, color by color, data of gamma curves for eight colors of Y, M, C, K, R, G, B, and Pb, the gamma curves which are used to correct the gradation characteristics of the image forming section 40. The gamma curves are used to perform gradation conversion in such a way that output densities and input values can have a linear relationship, and the input values are respectively correlated with the output values. Each gamma curve may be stored in a form of an operation expression to an input value, or in a form of an LUP (Look Up Table) in which the input values are respectively correlated with the output values. A method of creating the gamma curve is described below.

The communication section 80 includes a modem, a LAN (Local Area Network) adapter, a router, and a TA (terminal Adapter), and controls communications with each device connected to a network N.

Next, the method of creating the gamma curve is described.

In the embodiment, the gamma curve is created when a user operates the operation display section 20 or when images are formed on a predetermined number of sheets of paper P. The creating timing of the gamma curve can be optionally set.

First, one of the gradation pattern images shown in FIGS. 4 to 9 is outputted. Then, the density detection section 60 measures each gradation patch of each color patch of the gradation pattern image, and outputs the image density signal which shows the measurement result to the control section 10.

Then, the control section 10 obtains an intermediate signal of each of the primary (first) colors of C, M, Y, and K, each of the secondary colors of R, G, and B, and the tertiary color of Pb from the inputted image density signal. The intermediate signal determines a gamma value of an output gradation of each gradation patch of each color patch thereof. As shown in FIG. 10, for cyan (C), the intermediate signal is obtained from the R signal of the image density signal, R which is a complementary color of C. For magenta (M), the intermediate signal is obtained from the G signal of the image density signal, G which is a complementary color of M. For yellow (Y), the intermediate signal is obtained from the B signal of the image density signal, B which is a complementary color of Y. For black (K), the intermediate signal can be obtained from any of the R, G, and B signals of the image density signal, but in the embodiment, is obtained from the G signal of the image density signal.

With regard to each of the secondary colors of R, G, and B, and the tertiary color of Pb, of a luminance signal (Y) and a color difference signal (Cr/Cb) which are determined from the R, G, and B signals, the luminance signal (Y) is obtained as the intermediate signal. For example, the luminance signal (Y) is obtained by the following formula 1. In the following formula 1, (R), (G), and (B) are gamma values of the colors of R, G, and B, respectively, and determined from the R, G, and B signals of the image density signal, respectively.

$$Y=0.229*(R)+0.587*(G)+0.114*(B) \qquad \text{[Formula 1]}$$

The intermediate signal of the secondary colors and the tertiary color is not limited to the calculation result of the formula 1. The intermediate signal may be obtained by mixing gamma values of R, G, and B at an optional ratio of R:G:B, for example, R:G:B=3:6:1.

In the embodiment, the density detection section 60 measures a plurality of points of each gradation patch, and outputs the image density signals respectively obtained at the points to the control section 10. Then, at the control section 10, the average value of gamma values is calculated gradation by gradation, the gamma values which are determined from the image density signals, and gamma values used for the gamma curve are obtained. It is possible that a plurality of the gradation pattern images are outputted, all the outputted gradation pattern images are measured, and the average value of gamma values is calculated gradation by gradation.

The control section 10 stores the gamma values of the respective gradations of each color obtained in the way described above, for example, as a table shown in FIG. 11, in the storage section 70. The gamma values obtained as described above are stored in the "Sample" field. The table shown in FIG. 11 is for cyan. Similarly, tables for the other colors are created. Each of the gamma values shown in the "Target" field in FIG. 11 indicates a value corresponding to a target density of an image to be outputted to an input value. For example, each gamma value in the "Target" field is a gamma value of each gradation measured before the image forming apparatus 100 is on the market. Each gamma value in the "Target" field is not limited to a gamma value obtained by some measurement, and may be a value inputted and set from the operation display section 20, or a value inputted from outside via the communication section 80.

In FIG. 11, the gamma values in the "Sample" field are smaller than the gamma values in the "Target" field. That is, it is known therefrom that the density of the outputted image is lower than its target.

As for the gamma value corresponding to a gradation value "0", it is possible that a gradation patch is formed and measured to obtain the gamma value. However, in the embodiment, the gamma value is obtained by measuring a part on the paper P, the part on which a gradation patch is not formed.

Figure 12:
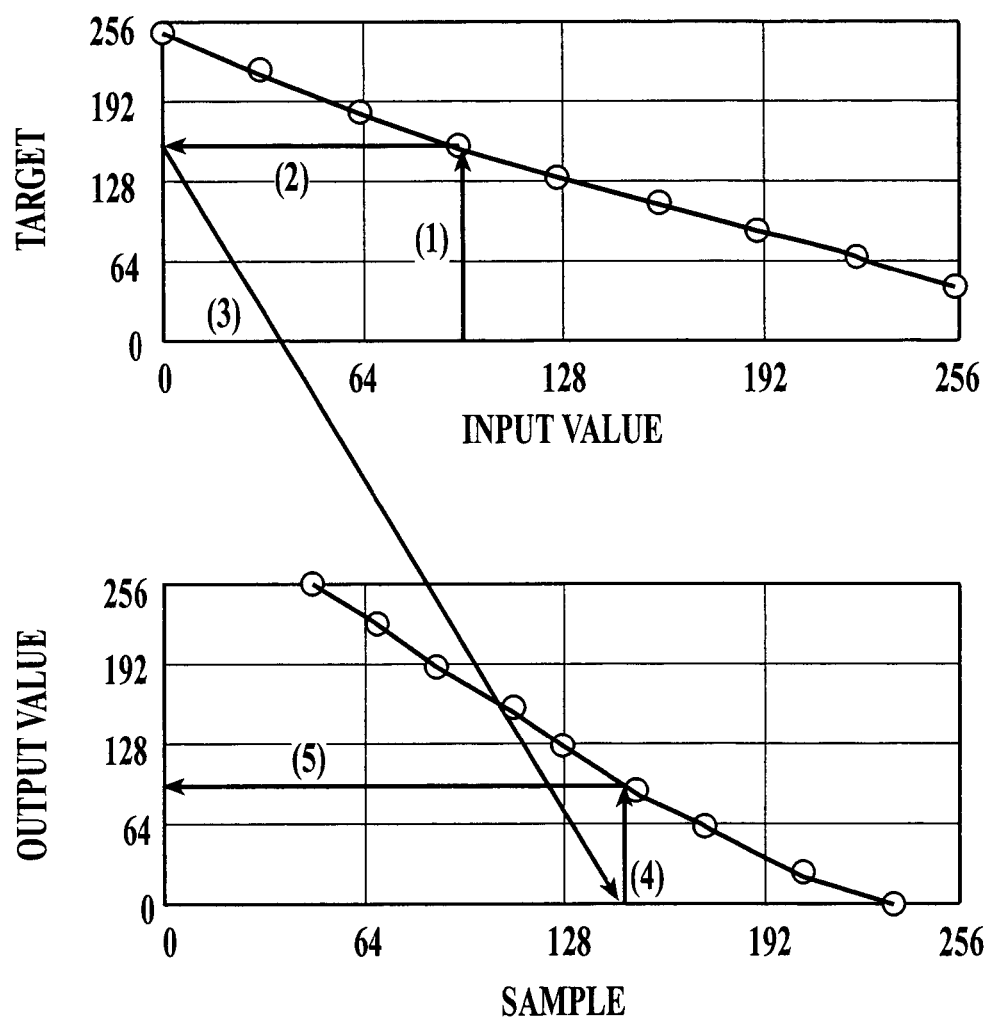
FIG. 12 shows graphs for explaining a relationship between input values and the gamma values.

When the gamma values shown in the "Target" field and the "Sample" field obtained as described above are plotted, graphs shown in FIG. 12 are obtained. FIG. 12 shows the gamma values in the "Target" field to input values, and output values to the gamma values in the "Sample" field. That is, the output values shown in FIG. 12 are the gradation values.

In FIG. 12, points of each graph are connected by a curve which is approximated by a polynomial.

The control section 10 creates a gamma curve based on the gamma values in the "Target" field and the "Sample" field, the gamma curve by which the output values are obtained from the input values. More specifically, as shown in FIG. 12, the control section 10 refers to the gamma values in the "Target" field for an input value, the gamma values which respectively correspond to the gradation values, and calculates a gamma value for the input value by polynomial approximation ((1) and (2) in FIG. 12), and refers to the gamma values in the "Sample" field, the gamma values which respectively correspond to the gradation values, and calculates a gradation value for the calculated gamma value by polynomial approximation ((3) to (5) in FIG. 12), thereby obtaining an output value for the input value. The control section 10 obtains an output value for an input value with regard to each of gradations ranging from 0 to 255, and tables the input values and output values so as to create the gamma curve. The control section 10 stores the gamma curve created as described above in the gamma curve storage section 72. Similarly, gamma curves for the colors of C, M, Y, K, R, G, B, and Pb are created.

In the embodiment, an output value is calculated from an input value by using polynomial approximation. However, an output value may be obtained from an input value by using another algorism such as spline interpolation or linear interpolation.

Next, steps of color adjustment performed based on the gamma curves created as described above are described referring to FIG. 13. The color adjustment according to the embodiment is performed by functions of sections shown in FIG. 13.

In the embodiment, the functions of the sections are activated by a software process which is performed by the CPU and the programs stored in the ROM working together. However, the functions of the sections may be activated by a circuit provided to activate the functions, a processor dedicated thereto, or the like.

Figure 13:
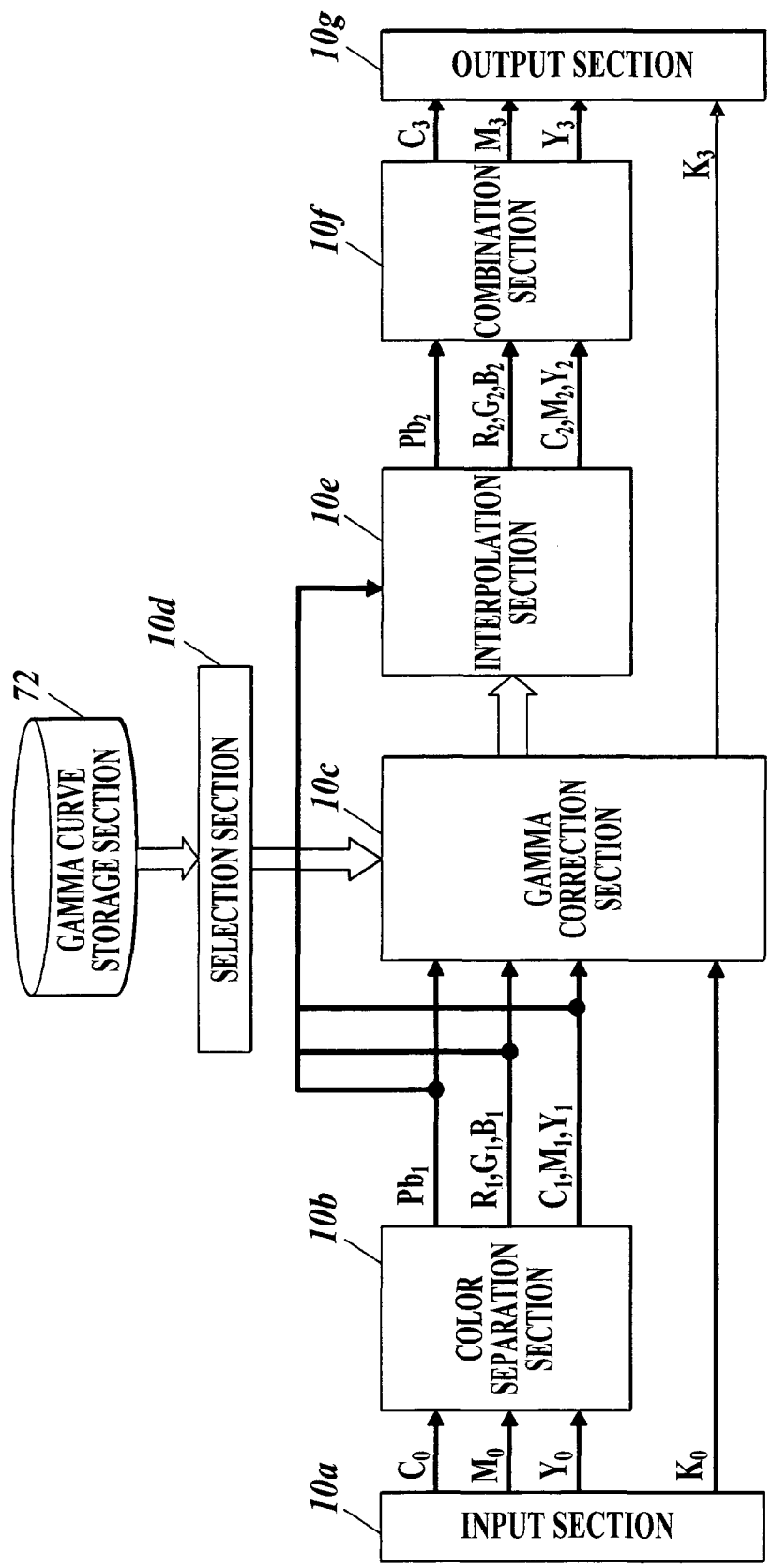
FIG. 13 is a schematic block diagram for explaining color adjustment.

As shown in FIG. 13, when data showing gradation values of C, M, Y, and K are inputted into an input section 10a, the input section 10a outputs $C_0$, $M_0$, and $Y_0$ which are data respectively showing the gradation values of C, M, and Y to a color separation section 10b, and outputs $K_0$ which is data showing the gradation value of K to a gamma correction section 10c. In the embodiment, as for K, color separation described below is not performed, and only gamma correction is performed.

When $C_0$, $M_0$, and $Y_0$ are inputted, the color separation section 10b extracts primary color (C, M, and Y) compositions, secondary color (R, G, and B) compositions, and a tertiary color (Pb) composition based on $C_0$, $M_0$, and $Y_0$.

More specifically, the tertiary color composition ($Pb_1$) is extracted from $C_0$, $M_0$, and $Y_0$. That is, the minimum value (tertiary color composition value) is determined from among $C_0$, $M_0$, and $Y_0$, and the tertiary color composition value is set to each of C, M, and Y, so that $Pb_1$ is determined. When any of $C_0$, $M_0$, and $Y_0$ is "0", $Pb_1$ is not extracted.

Next, the secondary color composition ($R_1$, $G_1$, or $B_1$) is extracted from $C_0$, $M_0$, and $Y_0$. That is, the second smallest value (secondary color composition value) is determined from among $C_0$, $M_0$, and $Y_0$, and the secondary color composition value is set to two of C, M, and Y, except for one which corresponds to the data determined as the minimum value. Consequently, one of $R_1$, $G_1$, and $B_1$ is extracted. For example, $B_1$ is extracted when the secondary color composition value is set to C and M, $G_1$ is extracted when the secondary color composition value is set to C and Y, and $R_1$ is extracted when the secondary color composition value is set to M and Y. When two of $C_0$, $M_0$, and $Y_0$ are "0", none of $R_1$, $G_1$, and $B_1$ is extracted.

Next, the primary color composition ($C_1$, $M_1$, or $Y_1$) is extracted from $C_0$, $M_0$, and $Y_0$. That is, the maximum value (primary color composition value) is determined from among $C_0$, $M_0$, and $Y_0$, and the primary color composition value is set to one of C, M, and Y, the one which corresponds to the data determined as the maximum value. Consequently, one of $C_1$, $M_1$, and $Y_1$ is extracted.

The color separation section 10b outputs $Pb_1$, $R_1$, $G_1$, $B_1$, $C_1$, $M_1$, and $Y_1$ to a gamma correction section 10c and an interpolation section 10e.

When $Pb_1$, $R_1$, $G_1$, $B_1$, $C_1$, $M_1$, $Y_1$, and $K_0$ are inputted into the gamma correction section 10c, gamma curves respectively corresponding to the inputted data are read from the gamma curve storage section 72, and inputted into the gamma correction section 10c.

Using the gamma curves, the gamma correction section 10c performs gamma correction on the inputted data.

That is, for $Pb_1$ which is the tertiary color data, the gamma curve for Pb is used, and an output value $Pb_1(\gamma Pb)$ is obtained from the input value $Pb_1$.

For $R_1$, $G_1$, and $B_1$ which are the secondary color data, the gamma curves for R, G, and B are used, respectively, and output values (first corrected gradation values) $R_1(\gamma R)$, $G_1(\gamma G)$, and $B_1(\gamma B)$ are respectively obtained from the input values $R_1$, $G_1$, and $B_1$. In addition, for $R_1$, $G_1$, and $B_1$, the gamma curve for the tertiary color Pb is used, and output values (second corrected gradation values) $R_1(\gamma Pb)$, $G_1(\gamma Pb)$, and $B_1(\gamma Pb)$ are respectively obtained from the input values $R_1$, $G_1$, and $B_1$.

For $C_1$, $M_1$, and $Y_1$ which are the primary color data, the gamma curves for C, M, and Y are used, respectively, and output values (first corrected gradation values) $C_1(\gamma C)$, $M_1(\gamma M)$, and $Y_1(\gamma Y)$ are respectively obtained from the input values $C_1$, $M_1$, and $Y_1$. In addition, for $C_1$, $M_1$, and $Y_1$, the gamma curves for the secondary colors R, G, and B are used, and output values (second corrected gradation values) are respectively obtained from the input values $C_1$, $M_1$, and $Y_1$. The output values respectively obtained from the input values $C_1$, $M_1$, and $Y_1$ by using the gamma values for R, G, and B depend on the secondary color composition extracted at the color separation section 10b. For example, when the extracted primary color composition is $C_1$, and the extracted secondary color composition is $G_1$, an output value (second corrected gradation value) $C_1(\gamma G)$ is obtained from the input value $C_1$ by using the gamma curve for G.

For $K_0$, the gamma curve for K is used, and an output value $K_3$ is obtained from the input value $K_0$.

The gamma correction section 10c outputs the output value $K_3$ to an output section 10g, and the other output values to the interpolation section 10e.

The interpolation section 10e interpolates the output values which are inputted thereinto, and outputs the result of the interpolation to a combination section 10f.

More specifically, with regard to the secondary color compositions, the output values (first corrected gradation values) $R_1(\gamma R)$, $G_1(\gamma G)$, and $B_1(\gamma B)$, which are obtained by using the gamma curves for the secondary colors R, G, and B, respectively, and the output values (second corrected gradation values) $R_1(\gamma Pb)$, $G_1(\gamma Pb)$, and $B_1(\gamma Pb)$, which are obtained by using the gamma curve for the tertiary color Pb, are interpolated, respectively. A weighting of the interpolation is carried out by a ratio of $R_1$, $G_1$, or $B_1$ to $Pb_1$ which are inputted from the color separation section 10b. $R_2$, $G_2$, and $B_2$ obtained by the interpolation are calculated by the following formulas (2) to (4), respectively.

$$R_2 = \{Pb_1 * R_1(\gamma Pb) + (R_1 - Pb_1) * R_1(\gamma R)\}/R_1 \quad \text{[Formula 2]}$$

$$G_2 = \{Pb_1 * G_1(\gamma Pb) + (G_1 - Pb_1) * G_1(\gamma G)\}/G_1 \quad \text{[Formula 3]}$$

$$B_2 = \{Pb_1 * B_1(\gamma Pb) + (B_1 - Pb_1) * B_1(\gamma B)\}/B_1 \quad \text{[Formula 4]}$$

With regard to the primary color compositions, the output values (first corrected gradation values) $C_1(\gamma C)$, $M_1(\gamma M)$, and $Y_1(\gamma Y)$, which are obtained by using the gamma curves for the primary colors C, M, and Y, respectively, and the output values (second corrected gradation values) $C_1(\gamma G)$ or $C_1(\gamma B)$, $M_1(\gamma R)$ or $M_1(\gamma B)$, and $Y_1(\gamma G)$ or $Y_1(\gamma R)$, which are obtained by using the gamma curves for the secondary colors R, G, and B, are interpolated, respectively. A weighting of the interpolation is carried out by a ratio of $C_1$ to $G_1$ or $B_1$, of $M_1$ to $R_1$ or $B_1$, or of $Y_1$ to $G_1$ or $R_1$ which are inputted from the color separation section 10b. $C_2$, $C_2$, $M_2$, $M_2$, $Y_2$ and $Y_2$ obtained by the interpolation are calculated by the following formulas (5) to (10), respectively.

$$C_2 = \{G_1 * C_1(\gamma G) + (C_1 - G_1) * C_1(\gamma C)\}/C_1 \quad \text{[Formula 5]}$$

$$C_2 = \{B_1 * C_1(\gamma B) + (C_1 - B_1) * C_1(\gamma C)\}/C_1 \quad \text{[Formula 6]}$$

$$M_2 = \{R_1 * M_1(\gamma R) + (M_1 - R_1) * M_1(\gamma M)\}/M_1 \quad \text{[Formula 7]}$$

$$M_2 = \{B_1 * M_1(\gamma B) + (M_1 - B_1) * M_1(\gamma M)\}/M_1 \quad \text{[Formula 8]}$$

$$Y_2 = \{G_1 * Y_1(\gamma G) + (Y_1 - G_1) * Y_1(\gamma Y)\}/Y_1 \quad \text{[Formula 9]}$$

$$Y_2 = \{R_1 * Y_1(\gamma R) + (Y_1 - R_1) * Y_1(\gamma Y)\}/Y_1 \quad \text{[Formula 10]}$$

The interpolation section 10e outputs the obtained values ($R_2$, $G_2$, $B_2$, $C_2$, $M_2$, and $Y_2$) to the combination section 10f. The interpolation is not performed on the output value $Pb_1$ ($\gamma Pb$) inputted into the interpolation section 10e, and $Pb_1$ ($\gamma Pb$) is outputted to the combination section 10f as $Pb_2$.

The combination section 10f combines the values inputted from the interpolation section 10e so as to determine the gradation values of C, M, and Y which are outputted to the output section 10g.

More specifically, the combination section 10f compares gradation values C', M', and Y' of C, M, and Y, the gradation values which are determined by $Pb_2$, with gradation values C'', M'', and Y'' of C, M, and Y, the gradation values which are determined by $R_2$, $G_2$, and $B_2$, and also with gradation values C''', M''', and Y''' of C, M, and Y, the gradation values which are determined by $C_2$, $M_2$, and $Y_2$, thereby determining the final output values $C_3$, $M_3$, and $Y_3$. That is, the combination section 10f extracts the maximum value from among C', C'', and C''' and determines the maximum value as $C_3$, extracts the maximum value from among M', M'', and M''' and determines the maximum value as $M_3$, and extracts the maximum value from among Y', Y'', and Y''' and determines the maximum value as $Y_3$. Thus, the final output values $C_3$, $M_3$, and $Y_3$ are determined.

The combination section 10f outputs the determined $C_3$, $M_3$, and $Y_3$ to the output section 10g.

The output section 10g converts the inputted $C_3$, $M_3$, $Y_3$, and $K_3$ into data showing the gradation values of C, M, Y, and K, respectively, the gradation values the correction of which is completed, and outputs the data.

Examples of the color separation, the gamma correction, and the interpolation which are performed by the configuration described above are described referring to FIGS. 14 to 16. The interpolation described below is an example, and the method of the interpolation is not limited thereto.

Figure 14:
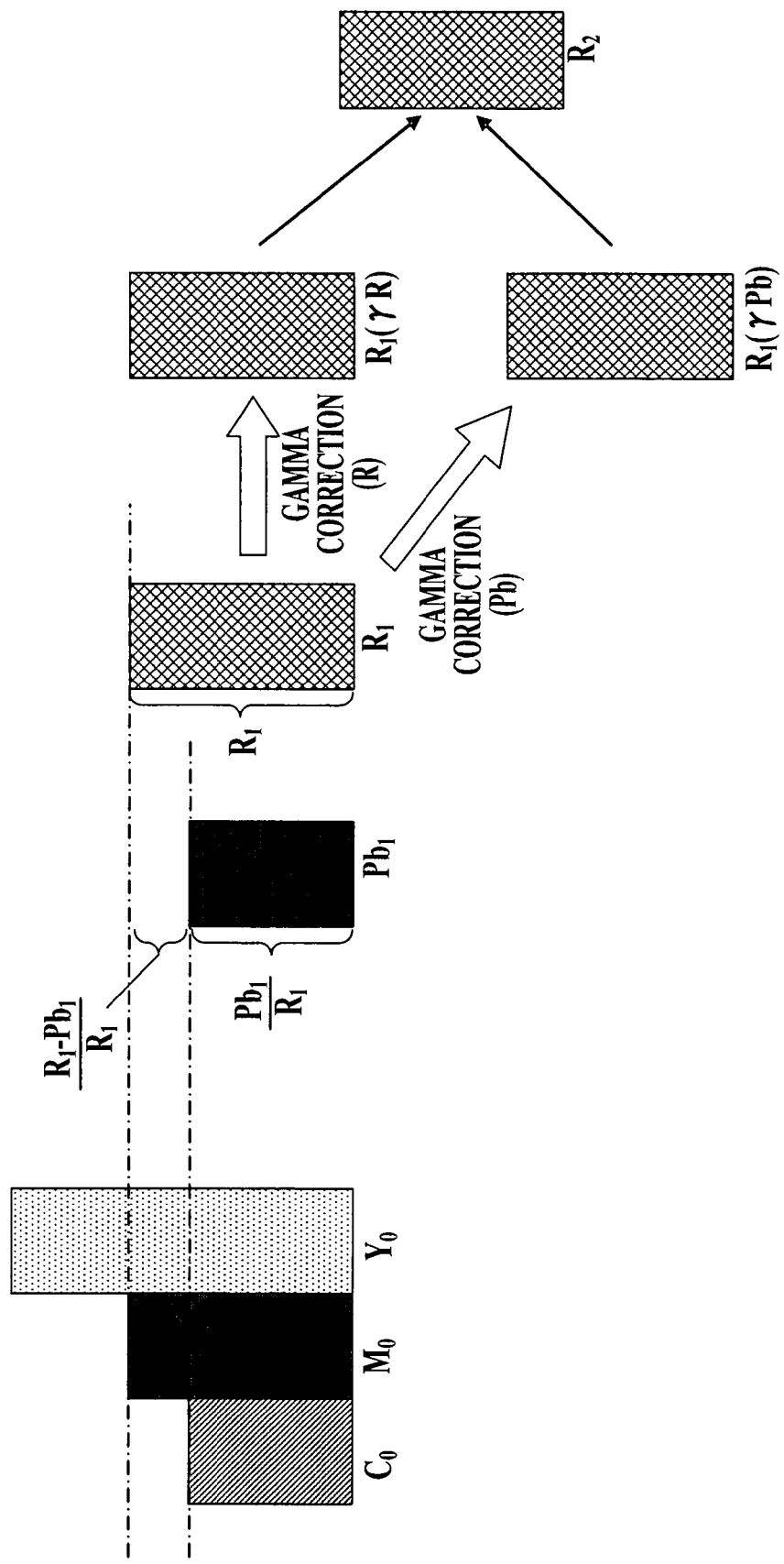
FIG. 14 is a diagram for explaining gamma correction and interpolation.

In the example shown in FIG. 14, the tertiary color composition $Pb_1$ is extracted at the color separation section 10b based on $C_0$, $M_0$, and $Y_0$ which are outputted from the input section 10a. In this case, a value shown by $C_0$ which corresponds to cyan is the minimum value, and hence the tertiary color composition value is equal to the value of $C_0$.

In addition, the secondary color composition is extracted at the color separation section 10b. In this case, since the color corresponding to $C_0$ is cyan, $C_0$ which shows the minimum value from among $C_0$, $M_0$, and $Y_0$, $R_1$ is extracted as the secondary color composition, $R_1$ which represents red constituted of two colors of magenta and yellow among the three colors of magenta, yellow, and cyan. Since the second smallest value among $C_0$, $M_0$, and $Y_0$ is $M_0$ which corresponds to magenta, the secondary color composition value is equal to the value of $M_0$.

In addition, since the maximum value among $C_0$, $M_0$, and $Y_0$ is $Y_0$, the primary color composition extracted at the color separation section 10b is $Y_1$ which represents yellow, and the primary color composition value is equal to the value of $Y_0$.

Next, the gamma correction is performed on the extracted primary, secondary, and tertiary color compositions at the gamma correction section 10c. The gamma correction and the interpolation on the secondary color composition $R_1$ are only described referring to FIG. 14, and the description of the gamma correction and the interpolation on the other color compositions is omitted.

First, the gamma correction is performed on the secondary color composition $R_1$ by using the gamma curve for R, and the output value (first corrected gradation value) $R_1(\gamma R)$ is obtained. Also, the gamma correction is performed on the secondary color composition $R_1$ by using the gamma curve for Pb, and the output value (second corrected gradation value) $R_1(\gamma Pb)$ is obtained.

Then, the obtained output values $R_1(\gamma R)$ and $R_1(\gamma Pb)$ are interpolated at the interpolation section 10e. In this case, the formula 2 is used so that $R_1(\gamma R)$ and $R_1(\gamma Pb)$ are interpolated by a ratio of $(R_1 - Pb_1)$ to $Pb_1$. Accordingly, $R_2$ as the corrected secondary color composition is calculated.

Figure 15:
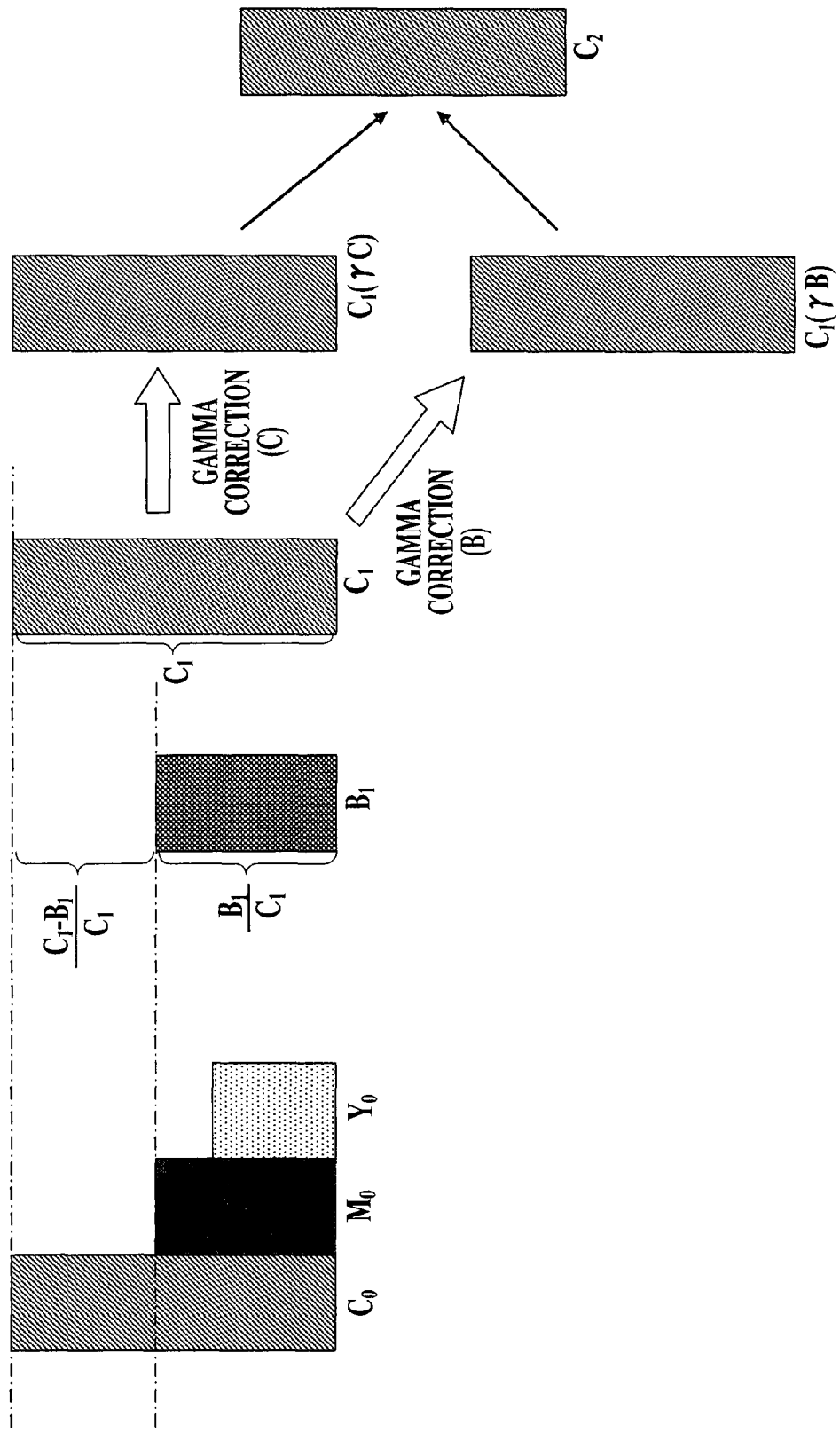
FIG. 15 is a diagram for explaining the gamma correction and the interpolation.

In the example shown in FIG. 15, as described above, the tertiary color composition $Pb_1$ is extracted at the color separation section 10b based on $C_0$, $M_0$, and $Y_0$ which are outputted from the input section 10a.

In addition, the secondary color composition is extracted at the color separation section 10b. In this case, since the minimum value among $C_0$, $M_0$, and $Y_0$ is $Y_0$, $B_1$ is extracted as the secondary color composition, $B_1$ which represents blue constituted of two colors of cyan and magenta among the three colors of cyan, magenta, and yellow. Since the second smallest value among $C_0$, $M_0$, and $Y_0$ is $M_0$ which corresponds to magenta, the secondary color composition value is equal to the value of $M_0$.

In addition, since the maximum value among $C_0$, $M_0$, and $Y_0$ is $C_0$, the primary color composition extracted at the color separation section 10b is $C_1$ which represents cyan, and the primary color composition value is equal to the value of $C_0$.

Next, the gamma correction is performed on the extracted primary, secondary, and tertiary color compositions at the gamma correction section 10c. The gamma correction and the interpolation on the primary color composition $C_1$ are only described referring to FIG. 15, and the description of the gamma correction and the interpolation on the other color compositions is omitted.

First, the gamma correction is performed on the primary color composition $C_1$ by using the gamma curve for C, and the output value (first corrected gradation value) $C_1(\gamma C)$ is obtained. Also, the gamma correction is performed on the primary color composition $C_1$ by using the gamma curve for B, and the output value (second corrected gradation value) $C_1(\gamma B)$ is obtained.

Then, the obtained output values $C_1(\gamma C)$ and $C_1(\gamma B)$ are interpolated at the interpolation section 10e. In this case, the formula 6 is used so that $C_1(\gamma C)$ and $C_1(\gamma B)$ are interpolated by a ratio of $(C_1 - B_1)$ to $B_1$. Accordingly, $C_2$ as the corrected primary color composition is calculated.

There is a case where the color compositions are extracted at the color separation section 10b, but the secondary color composition is not extracted. Steps of the color adjustment in this case are described in the following.

Figure 16:
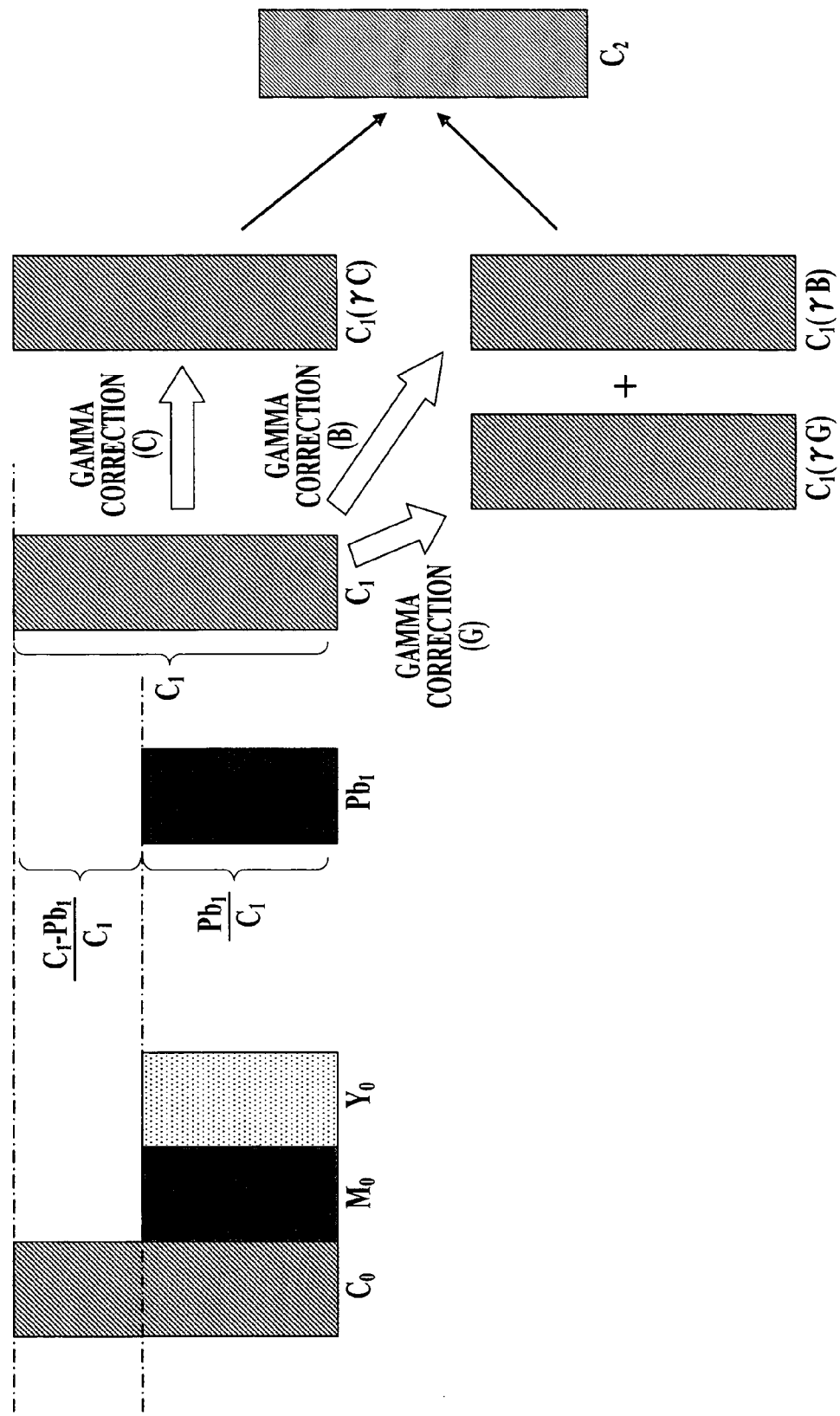
FIG. 16 is a diagram for explaining the gamma correction and the interpolation.

In the example shown in FIG. 16, as described above, the tertiary color composition $Pb_1$ is extracted at the color separation section 10b based on $C_0$, $M_0$, and $Y_0$ which are outputted from the input section 10a.

In this example, there is no data which shows the second smallest value among $C_0$, $M_0$, and $Y_0$, and hence the secondary color composition is not extracted at the color separation section 10b.

Since the maximum value among $C_0$, $M_0$, and $Y_0$ is $C_0$, the primary color composition extracted at the color separation section 10b is $C_1$ which represents cyan, and the primary color composition value is equal to the value of $C_0$.

Next, the gamma correction is performed on the extracted primary and tertiary color compositions at the gamma correction section 10c. The gamma correction and the interpolation on the primary color composition $C_1$ are only described referring to FIG. 16, and the description of the gamma correction on the tertiary color composition is omitted.

First, the gamma correction is performed on the primary color composition $C_1$ by using the gamma curve for C, and the output value (first corrected gradation value) $C_1(\gamma C)$ is obtained. In this example shown in FIG. 16, since there is no secondary color composition, the gamma correction is performed on the primary color composition $C_1$ by using not the gamma curve for Pb, but the gamma curves for G and B respectively corresponding to the secondary colors of green and blue each of which is constituted of two colors including cyan, and the output values (pre-second corrected gradation values) $C_1(\gamma G)$ and $C_1(\gamma B)$ are obtained.

The reason why the gamma curve for Pb is not used, and the gamma curves for G and B are used to the primary color composition $C_1$ is, to ensure the gradation continuity. That is, in the example shown in FIG. 16, when $M_0$ becomes larger than $Y_0$, the gamma curve for B is used as the gamma curve for the secondary color, and when $Y_0$ becomes larger than $M_0$, the gamma curve for G is used as the gamma curve for the secondary color. Therefore, when $M_0$ is equal to $Y_0$, the gamma curve for Pb which is a different gamma curve from the gamma curve for B or G is used, the gradation discontinuity such as tone jump may occur. However, in the case where there is no secondary color composition, the gamma correction may be performed on the primary color composition by using the gamma curve for Pb.

The obtained output value (first corrected gradation value) $C_1(\gamma C)$ and the average value (second corrected gradation value) of the obtained output values (pre-second corrected gradation values) $C_1(\gamma G)$ and $C_1(\gamma B)$ are interpolated at the interpolation section 10e. In this case, a weighting of the interpolation is carried out by a ratio of $C_1$ to $Pb_1$. Accordingly, $C_2$ obtained by the interpolation is calculated by the following formula 11.

$$C_2 = [Pb_1 * \{(C_1(\gamma G) + C_1(\gamma B))/2\} + (C_1 - Pb_1) * C_1(\gamma C)] / C_1 \quad \text{[Formula 11]}$$

When the primary color composition extracted at the color separation section 10b is magenta, and there is no secondary color composition, the gamma correction is performed by using the gamma curves for M, R, and B, and $M_2$ is calculated by the following formula 12 based on the obtained output values $M_1(\gamma M)$, $M_1(\gamma R)$, and $M_1(\gamma B)$.

$$M_2 = [Pb_1 * \{(M_1(\gamma R) + M_1(\gamma B))/2\} + (M_1 - Pb_1) * M_1(\gamma M)] / M_1 \quad \text{[Formula 12]}$$

When the primary color composition extracted at the color separation section 10b is yellow, and there is no secondary color composition, the gamma correction is performed by using the gamma curves for Y, G, and R, and $Y_2$ is calculated by the following formula 13 based on the obtained output values $Y_1(\gamma Y)$, $Y_1(\gamma G)$, and $Y_1(\gamma R)$.

$$Y_2 = [Pb_1 * \{(Y_1(\gamma G) + Y_1(\gamma R))/2\} + (Y_1 - Pb_1) * Y_1(\gamma Y)] / Y_1 \quad \text{[Formula 13]}$$

Figure 17:
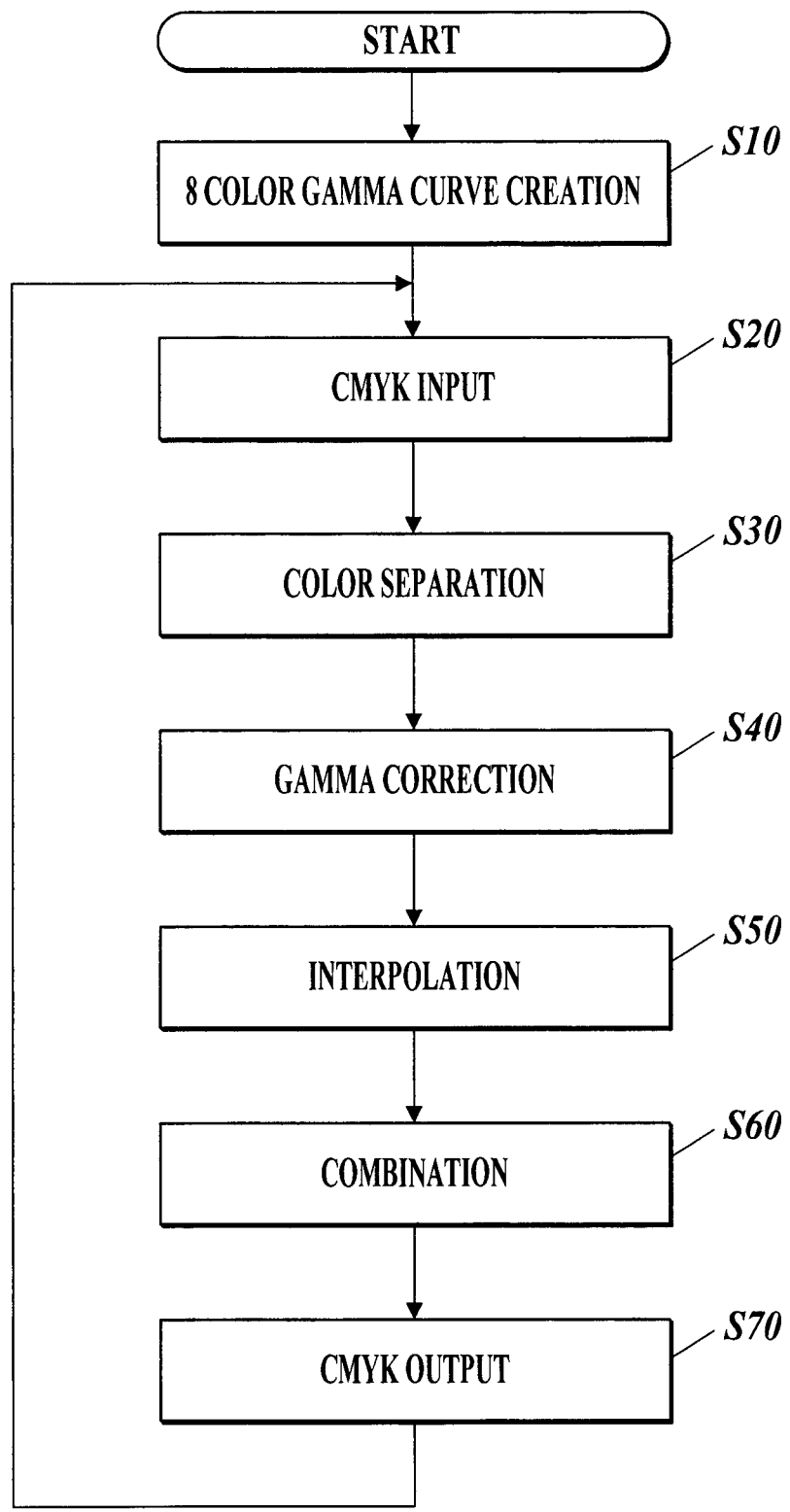
FIG. 17 is a flowchart for explaining steps of the color adjustment.

Steps of the color adjustment performed in the image forming apparatus 100 which is configured as described above is schematically shown by a flowchart shown in FIG. 17.

That is, the control section 10 creates the gamma curves for C, M, Y, K, R, G, B, and Pb based on the image density signals inputted from the density detection section 60 (Step S10).

After the gamma curves are created, and image data is inputted from the image reading section 30 or the communication section 80, the control section 10 inputs data of one pixel of the image data to the input section 10a, the data which show the gradation values of C, M, Y, and K (Step S20).

Then, the control section 10 allows the color separation section 10b to extract the primary, secondary, and tertiary color compositions (Step S30).

Then, the control section 10 allows the gamma correction section 10c to perform the gamma correction on the extracted primary, secondary, and tertiary color compositions by using the gamma curves (Steps S40).

Then, the control section 10 allows the interpolation section 10e to interpolate the output values obtained by the gamma correction (Step S50).

Then, the control section 10 allows the combination section 10f to combine the interpolated gamma values of the color compositions so as to determine the gradation values of C, M, and Y (Step S60).

Then, the control section 10 allows the output section 10g to convert the gradation values of C, M, Y, and K to the data showing the gradation values of C, M, Y, and K, and outputs the data (Step S70).

The control section 10 repeats Steps S20 to S70 until all the pixels of the image data are processed.

EXAMPLE

By the image forming apparatus 100 according to the embodiment of the present invention, color patches of 1472 colors were outputted and measured, the color patches each of which underwent the gamma correction on the primary, secondary, and tertiary color compositions, and color differences between the measured values and their respective target values were evaluated. As a comparative example, color patches of 1472 colors were outputted and measured, the color patches each of which underwent the gamma correction on only four color compositions of C, M, Y, and K, which is a conventional color adjustment, and color differences between the measured values and their respective target values were evaluated.

Figure 18:
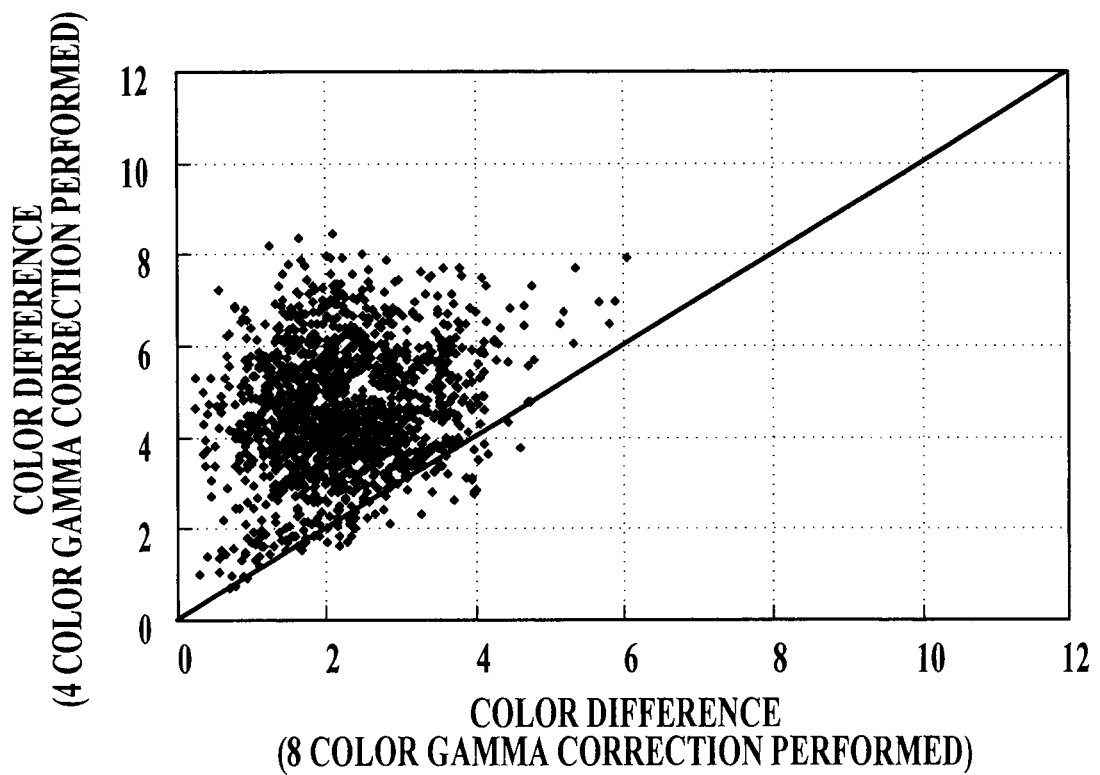
FIG. 18 is a graph showing color differences from targets.

The result thereof is shown in FIG. 18. In the distribution chart shown in FIG. 18, the x axis indicates the color differences between the measured values and their respective target values, the measured values which were obtained by measuring the color patches outputted by the image forming apparatus 100 according to the embodiment of the present invention, and the y axis indicates the color differences between the measured values and the respective target values, the measured values which were obtained in the comparative example. The color differences between the measured values obtained in the example and the target values are taken on the x axis, and the color differences between the measured values obtained in the comparative example and the target values are taken on the y axis. The intersection points thereof are plotted in the chart. In addition, a line expressed by a formula y=x is shown in the chart as a reference line for showing, with each color, which color difference is larger, the color difference between the measured value obtained in the example and the target value or the color difference between the measured value obtained in the comparative example and the target value.

As shown in FIG. 18, about 95% of all the intersection points are plotted above the line of y=x. That is, when the gamma correction is performed on the primary, secondary, and tertiary color compositions, the color difference between the measured value and the target value becomes smaller, and excellent image stability is obtained, as compared with when the gamma correction is performed on the only four color compositions of C, M, Y, and K, which is the conventional color adjustment.

[Second Embodiment]

Next, a second embodiment of the present invention is described. There are some differences between the density detection section 60 in the second embodiment and the density detection section 60 in the first embodiment. The basic configuration of the image forming apparatus 100 is the same in the first and second embodiments. Therefore, in the second embodiment, the differences from the first embodiment are described, and the components similar to the components described in the first embodiment are denoted by the same reference numerals, and the description thereof is not repeated.

Figure 19A:
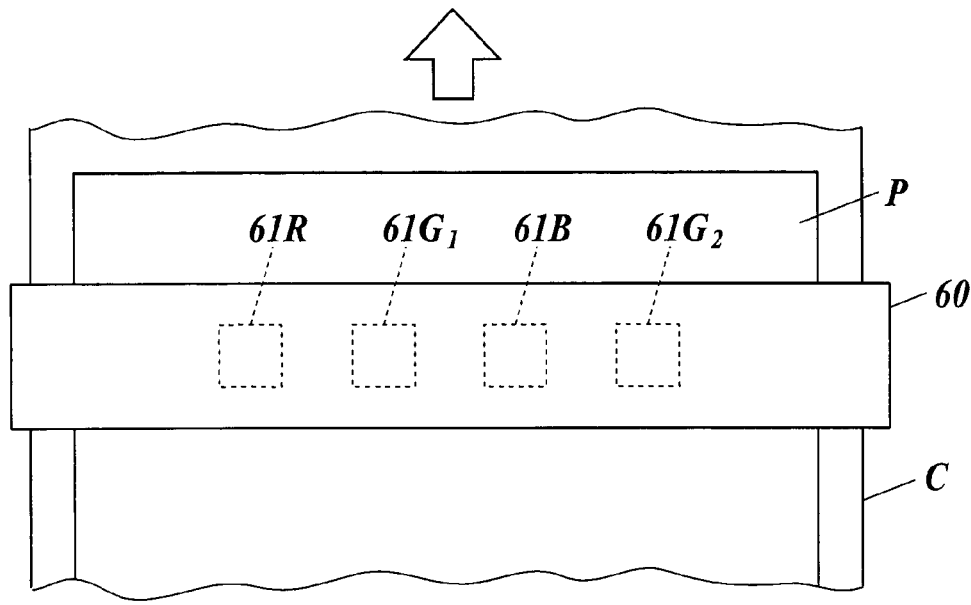
FIG. 19A is an enlarged plan view showing a schematic configuration of the density detection section according to a second embodiment.
Figure 19B:
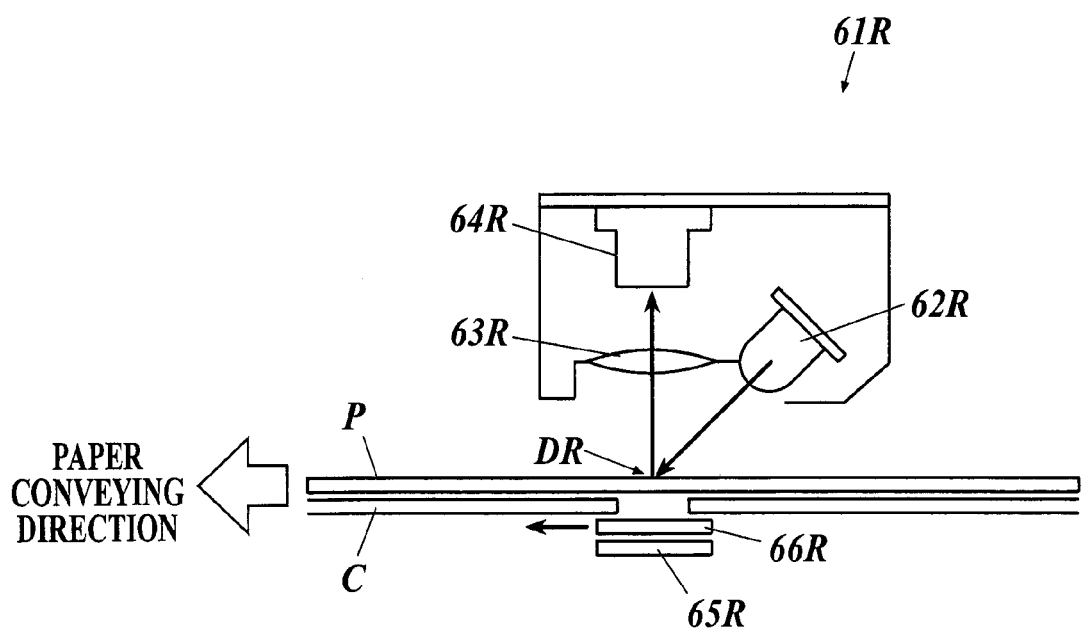
FIG. 19B is a lateral view showing the schematic configuration of the density detection section.

FIGS. 19A and 19B show a schematic configuration of the density detection section 60 according to the second embodiment. FIG. 19A is an enlarged plan view of the density detection section 60 disposed above the conveyance path C.

As shown in FIG. 19A, the density detection section 60 includes single-color density sensors 61R, 61$G_1$, 61B, and 61$G_2$ which are arranged parallel to the main-scanning direction for the paper P at predetermined intervals. The arrangement order of the single-color density sensors 61R, 61$G_1$, 61B, and 61$G_2$ is not limited to the order shown in FIG. 19A, and can be appropriately changed. In the second embodiment, as long as the single-color density sensors 61R, 61$G_1$, 61B, and 61$G_2$ are arranged at different positions from each other in the main-scanning direction, it is not necessary that the single-color density sensors 61R, 61$G_1$, 61B, and 61$G_2$ are arranged at the same position in the sub-scanning direction.

FIG. 19B shows a schematic lateral view of the single-color density sensor 61R. The single-color density sensors 61R, 61$G_1$, 61B, and 61$G_2$ are the same in configuration. Therefore, the schematic configuration of the single-color density sensor 61R is described, and the description of the schematic configuration of the other single-color density sensors is not repeated.

The single-color density sensor 61R includes an LED (Light Emitting Diode) 62R, a lens 63R, a light receiving device 64R, a white color reference plate 65R, and a reference plate cover 66R.

The LED 62R is a light emitter which emits red light. The single-color density sensors 61$G_1$ and 61$G_2$ respectively include an LED 62$G_1$ and an LED 62$G_2$ which emit green light, and the single-color density sensor 62B includes an LED 62B which emits blue light. The center wavelengths of the light emitted from the LEDs 62R, 62$G_1$, 62B, and 62$G_2$ are different depending on the colors as shown in FIG. 20. The red light emitted from the LED 62R is easily absorbed into cyan, the green light emitted from the LEDs 62$G_1$ and 62$G_2$ is easily absorbed into magenta, and the blue light emitted from the LED 62B is easily absorbed into yellow. That is, the color which has a complimentary color relationship with the color of the emitted light (luminescent color) has characteristics to easily absorb the light. Black has characteristics to absorb any of red, blue and green light. In the embodiment, in view of the above-described characteristics, a gradation pattern image is formed in such a way that the single-color density sensors 61R, 61$G_1$, 61B, and 61$G_2$, which respectively include the LEDs 62R, 62$G_1$, 62B, and 62$G_2$, read color patches of the gradation pattern image, the color patches having the colors which easily absorb the light emitted from the LEDs 62R, 62$G_1$, 62B, and 62$G_2$, respectively. In the embodiment, the LED is used as the light emitter. However, another light emitting device such as an EL (Electronic Luminescence) may be used instead.

The lens 63R condenses the light emitted from the LED 62R. The light receiving device 64R is constituted of, for example, a photo diode, and converts the amount of the received light into a voltage value, and outputs the voltage value. The white color reference plate 65R is a reflector plate for not absorbing but reflecting the light from the LED 62R, and used for calibration of the LED 62R described below. The reference plate cover 66R is used for preventing the white color reference plate 65R from becoming unclean by paper powders of the paper P or the like when the white color reference plate 65R is not used. When the white color reference plate 65R is used, the reference plate cover 66R is displaced from a covering position to an uncovering position for the white color reference plate 65R.

The single-color density sensor 61R configured as described above emits light from the LED 62R to each gradation patch of a color patch included in the gradation pattern image formed on the paper P conveyed on the conveyance path C, the gradation patch thereof which passes through a measurement position DR, and receives reflected light of the light by the light emitting device 64R via the lens 63R. Then, the light receiving device 64R outputs a voltage value corresponding to the amount of the reflected and received light as an image density signal to the control section 10. The output value from the single-color density sensor 61R, namely, the density of the measured image, is determined based on the image density signal. In the embodiment, the single-color density sensor 61R reads the gradation pattern image as described above. Similarly, the single-color density sensors 61$G_1$, 61B, and 61$G_2$ read the gradation pattern image. As the measurement position, measurement positions DR, D$G_1$, DB, and D$G_2$ are predetermined to be at suitable positions for the single-color density sensors 61R, 61$G_1$, 61B, and 61$G_2$, respectively.

The control section 10 (density information obtaining section) creates the gamma curves in the way described in the first embodiment based on the result of the reading of the gradation pattern image. The density detection section 60 and the control section 10 make up an image density measuring apparatus 110 according to the embodiment of the present invention.

Figure 21:
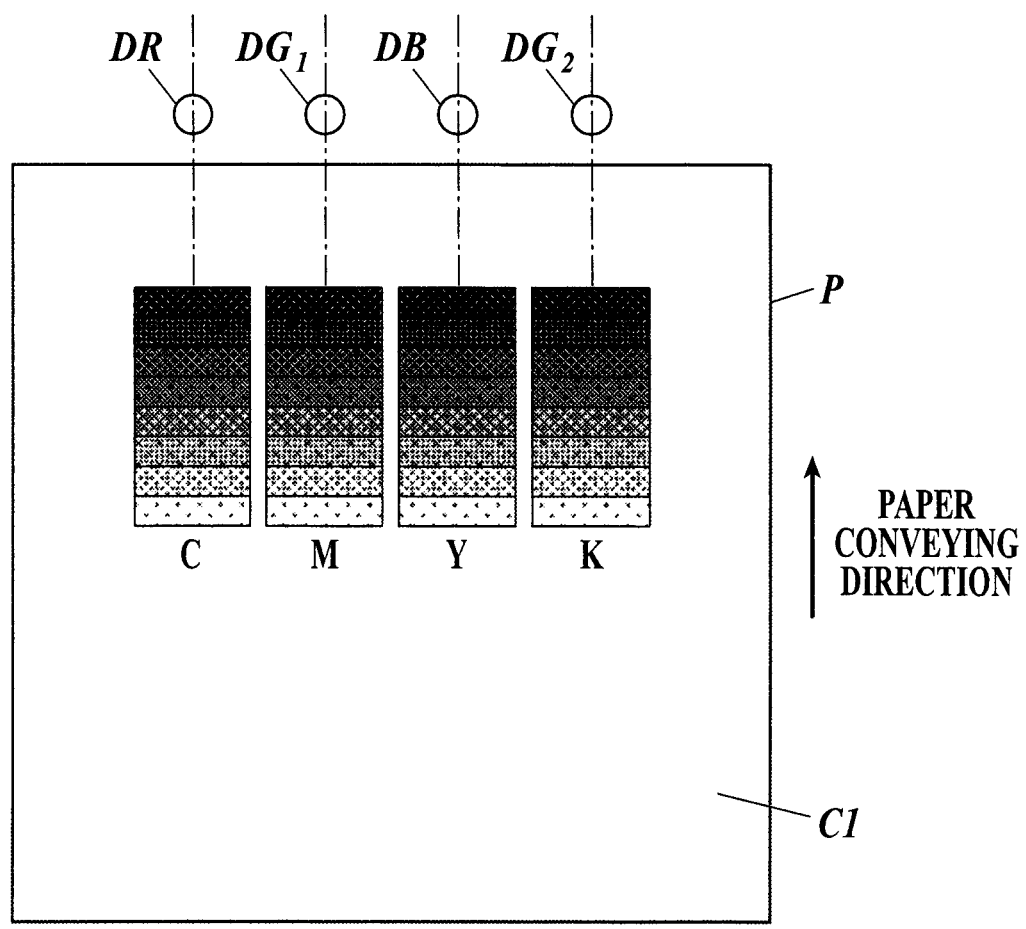
FIGS. 21 to 23 show a gradation pattern image.
Figure 22:
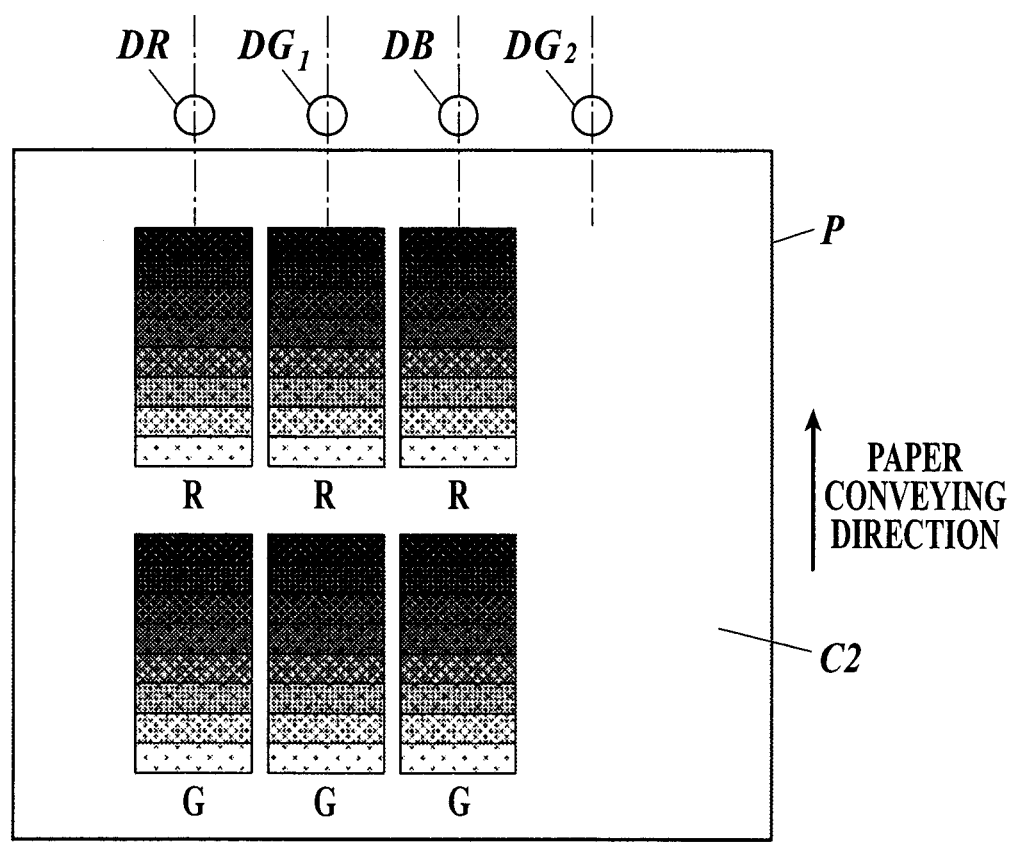
Figure 23:
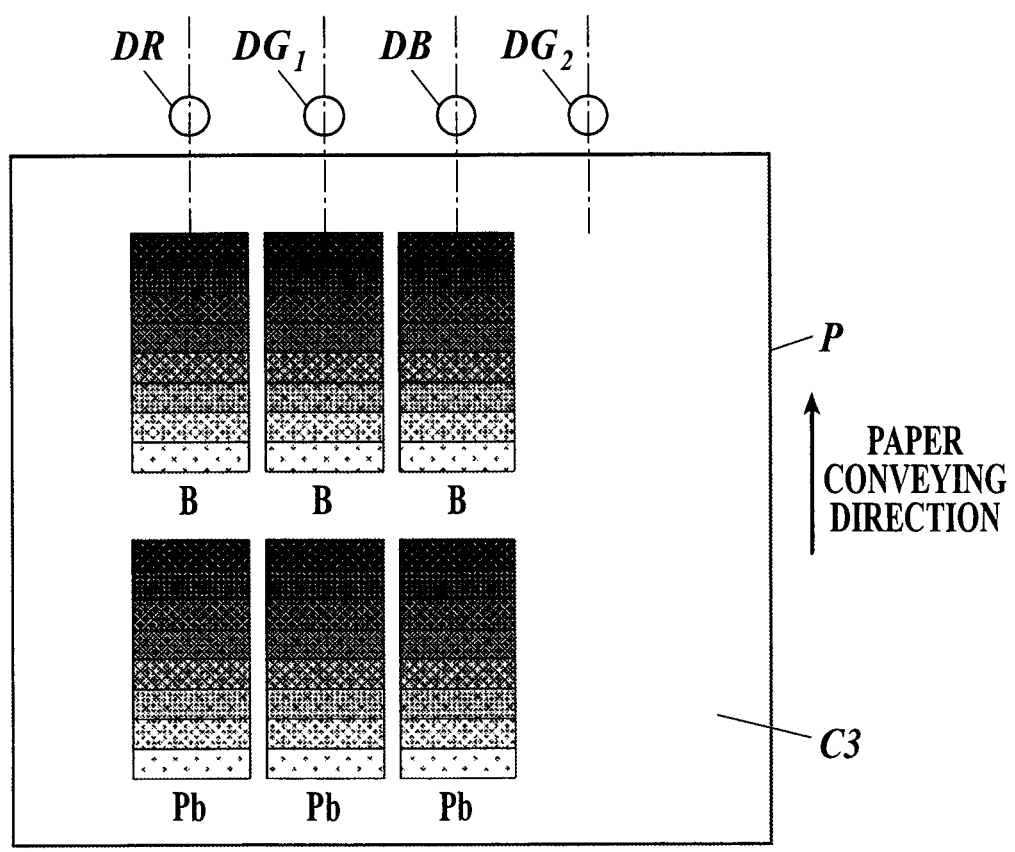

The gradation pattern image storage section 71 according to the second embodiment stores data to form gradation pattern image pieces C1, C2, and C3 of a gradation pattern image shown in FIGS. 21 to 23. The three gradation pattern image pieces C1, C2, and C3 are used to perform the density adjustment one time. As shown in FIG. 21, the gradation pattern image piece C1 formed on the paper P includes color patches of the colors C, M, Y, and K, the color patches each of which includes a plurality of gradation patches having densities (gradation values) different from each other. The range of the densities is from the minimum density (gradation value 32) to the maximum density (gradation value 255). For example, the gradation values of the gradation patches of each color patch included in the gradation pattern image piece C1 are 32, 64, 96, 128, 160, 192, 224, and 255. Each of the C, M, Y, and K color patches is formed in such a way as to be read by the single-color density sensor having the LED which emits light of the color which is absorbed into the color of the color patch. That is, the cyan (C) color patch is formed in such a way as to pass through the measurement position DR, the magenta (M) color patch is formed in such a way as to pass through the measurement position $DG_1$, the yellow (Y) color patch is formed in such a way as to pass through the measurement position DB, and the black (K) color patch is formed in such a way as to pass through the measurement position $DG_2$. Accordingly, the single-color density sensor reads the color patch the color of which is a complementary color of the color of the light emitted from the LED of the single-color density sensor.

Furthermore, as shown in FIG. 22, the gradation pattern image piece C2 formed on the paper P includes color patches of the colors R and G, the color patches each of which includes a plurality of gradation patches having densities (gradation values) different from each other. The range of the densities is from the minimum density (gradation value 32) to the maximum density (gradation value 255). For example, the gradation values of the gradation patches of each color patch included in the gradation pattern image piece C2 are 32, 64, 96, 128, 160, 192, 224, and 255. The R color patches and the G color patches are formed in such a way as to be read by the single-color density sensors 61R, $61G_1$, and 61B. Accordingly, the R color patches are formed in line in the main-scanning direction so as to pass through the measurement positions DR, $DG_1$, and DB, respectively, and so are the G color patches.

Furthermore, as shown in FIG. 23, the gradation pattern image piece C3 formed on the paper P includes color patches of the colors B and Pb, the color patches each of which includes a plurality of gradation patches having densities (gradation values) different from each other. The range of the densities is from the minimum density (gradation value 32) to the maximum density (gradation value 255). For example, the gradation values of the gradation patches of each color patch included in the gradation pattern image piece C3 are 32, 64, 96, 128, 160, 192, 224, and 255. The B color patches and the Pb color patches are formed in such a way as to be read by the single-color density sensors 61R, $61G_1$, and 61B. Accordingly, the B color patches are formed in line in the main-scanning direction so as to pass through the measurement positions DR, $DG_1$, and DB, respectively, and so are the Pb color patches.

In the embodiment, as shown in FIGS. 22 and 23, the green (G) color patches are formed below the red (R) color patches in the gradation pattern image piece C2, and the process black (Pb) color patches are formed below the blue (B) color patches in the gradation pattern image piece C3. However, the arrangement order of the color patches to be formed is not limited to the order shown in FIGS. 22 and 23, and can be appropriately set.

Furthermore, in the embodiment, in order to make it easy to detect the start point of each of the gradation pattern image pieces C1, C2, and C3, the gradation patches of each color patch are formed in descending order of density. However, the order of the gradation patches of each color patch is not limited thereto. Furthermore, in order to make it easy to detect the start point of each of the gradation pattern image pieces C1, C2, and C3, a reference bar image extending in the main-scanning direction may be formed.

Furthermore, in the embodiment, with regard to the secondary and tertiary color patches, the color patches of two colors are formed on each sheet of the paper P, and the color patches of the secondary and tertiary colors are read by using two sheets. However, the color patches of all the colors may be formed on one sheet, or may be formed on three sheets or more.

As shown in FIGS. 21 to 23, in the gradation pattern image according to the second embodiment, the color patches are formed parallel to the main-scanning direction, and hence it can be achieved that the color patches are read while the number of waste sheets is reduced.

Figure 24:
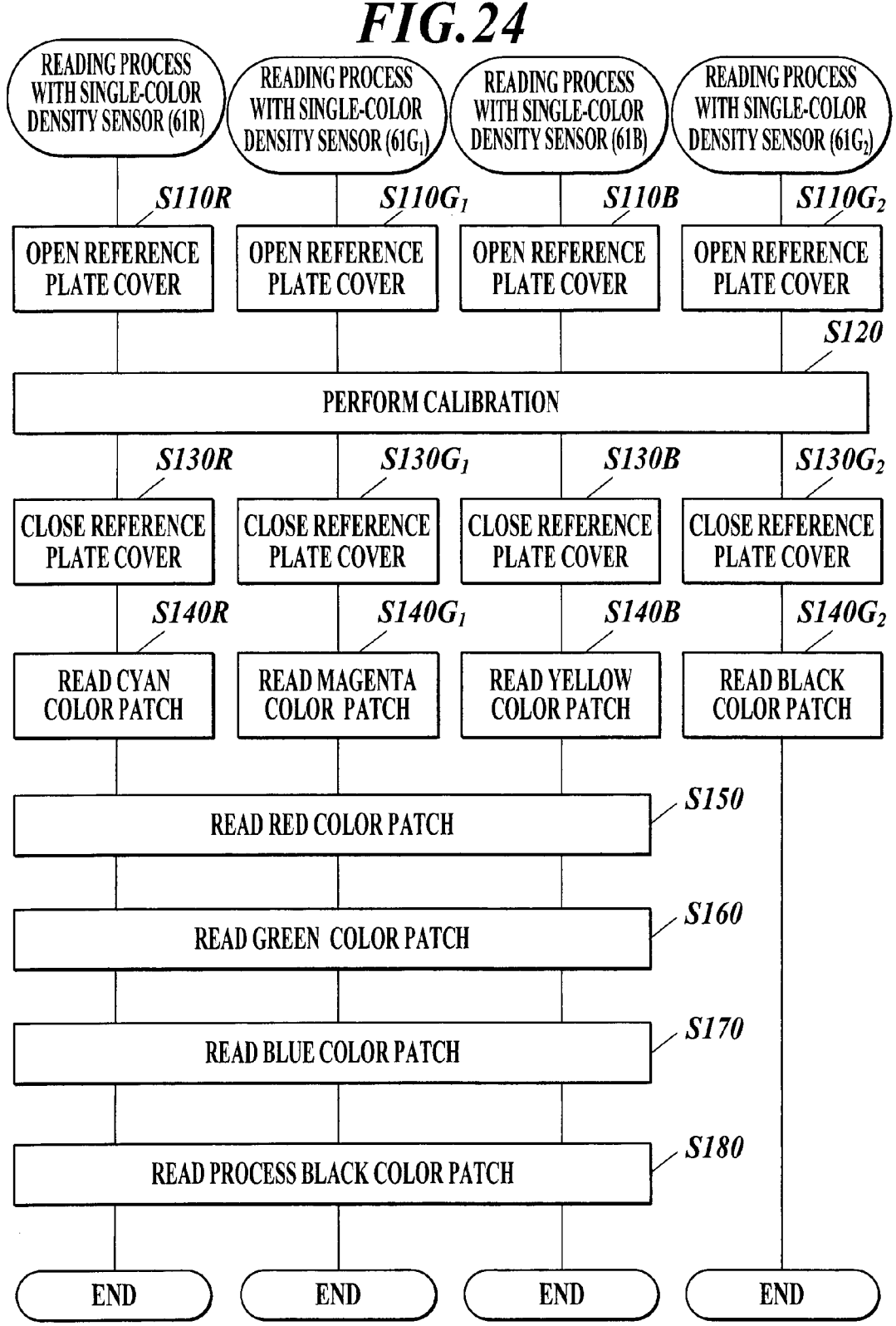
FIG. 24 is a flowchart showing steps of a gradation pattern image reading process according to the second embodiment.

Next, steps of a gradation pattern image reading process with the single-color density sensors 61R, $61G_1$, 61B, and $61G_2$ are described, referring to FIG. 24.

First, the control section 10 moves the reference plate covers 66R, $66G_1$, 66B, and $66G_2$ to their respective uncovering positions so that the upper surfaces of the white color reference plates 65R, $65G_1$, 65B, and $65G_2$ are uncovered (Steps S110R, $S110G_1$, S110B, and $S110G_2$).

Next, the control section 10 calibrates the LEDs 62R, $62G_1$, 62B, and $62G_2$ (Step S120). That is, the control section 10 allows the LEDs 62R, $62G_1$, 62B, and $62G_2$ to emit light; the light are reflected by the white color reference plates 65R, $65G_1$, 65B, and $65G_2$; the reflected light are received by the light emitting devices 64R, $64G_1$, 64B, and $64G_2$; the voltage values which respectively show the amounts of the reflected light are inputted to the control section 10 from the light emitting devices 64R, $64G_1$, 64B, and $64G_2$; and then, the control section 10 performs output adjustment on the LEDs 62R, $62G_1$, 62B, and $62G_2$ or gain adjustment on the light emitting devices 64R, $64G_1$, 64B, and $64G_2$ so as to make the voltage values inputted from the light emitting devices 64R, $64G_1$, 64B, and $64G_2$ the same.

Next, the control section 10 moves the reference plate covers 66R, $66G_1$, 66B, and $66G_2$ to their respective covering positions so that the upper surfaces of the white color reference plates 65R, $65G_1$, 65B, and $65G_2$ are covered (Steps S130R, $S130G_1$, S130B, and $3130G_2$).

Next, the control section 10 allows the image forming section 40 to form the gradation pattern image piece C1 shown in FIG. 21 on a sheet of the paper P, and allows the single-color density sensor 61R (first reading section) to read a cyan color patch (Step S140R), allows the single-color density sensor $61G_1$ (second reading section) to read a magenta color patch (Step $S140G_1$), allows the single-color density sensor 61B (third reading section) to read an yellow color patch (Step S140B), and allows the single-color density sensor $61G_2$ to read a black color patch (Step $S140G_2$).

Next, the control section 10 allows the image forming section 40 to form the gradation pattern image piece C2 shown in FIG. 22 on a sheet of the paper P, and allows the single-color density sensors 61R, $61G_1$, and 61B to read red color patches, respectively (Step S150), and then to read green color patches, respectively (Step S160).

Next, the control section 10 allows the image forming section 40 to form the gradation pattern image piece C3 shown in FIG. 23 on a sheet of the paper P, and allows the single-color density sensors 61R, $61G_1$, and 61B to read blue color patches, respectively (Step S170), and then to read process black color patches, respectively (Step S180).

Based on the image density signals of the colors obtained by reading the color patches as described above, the control section 10 performs, for example, the averaging process to obtain the average value of gamma values gradation by gradation, the gamma values which are determined from the image density signals and the combining process to combine the image density signals of the colors R, G, B, and Pb respectively obtained by the single-color density sensors 61R, 61G$_1$, and 61B so as to obtain the luminance signal Y described in the first embodiment.

In the embodiment, although the single-color density sensors the light source of each of which emits one color light are used, it is possible to read a color image which is constituted of not one primary color but colors including the secondary colors and the tertiary color, and to properly perform the image stabilizing process such as the calibration of color profiles and the gamma correction, based on the data of the read image.

In the embodiment, four single-color density sensors are used. However, three single-color density sensors may be enough if a gradation pattern image is formed in such a way that a black color patch is read by the single-color density sensor 61R, 61G$_1$, or 61B, for example.

[Third Embodiment]

Next, a third embodiment of the present invention is described. In the third embodiment, the configuration of the density detection section 60 is changed from that described in the second embodiment. In the third embodiment, the components similar to the components described in the first and second embodiments are denoted by the same reference numerals, and the description thereof is not repeated.

Figure 25:
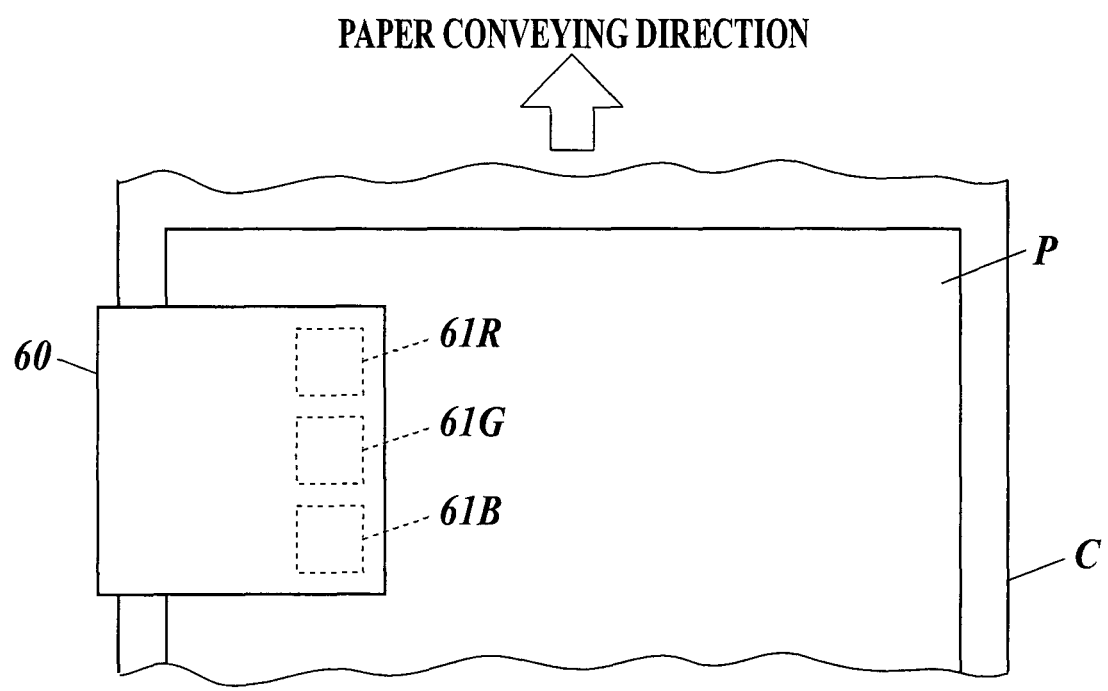
FIG. 25 is an enlarged plan view showing a schematic configuration of the density detection section according to a third embodiment.

As shown in FIG. 25, the density detection section 60 according to the third embodiment includes single-color density sensors 61R, 61G, and 61B which are arranged parallel to the sub-scanning direction for the paper P at predetermined intervals. In the third embodiment, the three single-color density sensors are used. The configuration of each of the single-color density sensors 61R, 61G, and 61B is the same as that described in the second embodiment. The arrangement order of the single-color density sensors 61R, 61G, and 61B is not limited to the order shown in FIG. 25, and can be appropriately changed.

The gradation pattern image storage section 71 according to the third embodiment stores data to form gradation pattern image pieces C4, C5, C6, and C7 of a gradation pattern image shown in FIGS. 26 to 29. The four gradation pattern image pieces C4, C5, C6, and C7 are used to perform the density adjustment one time.

Figure 26:
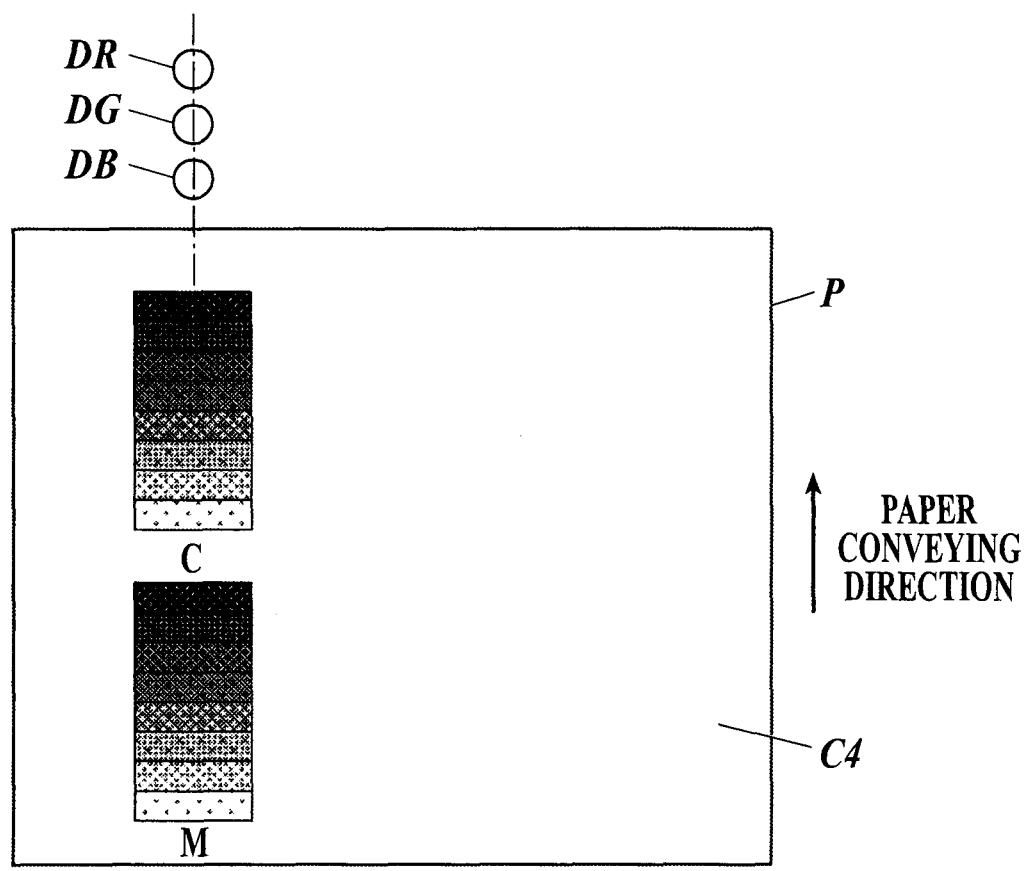
FIGS. 26 to 29 show a gradation pattern image.
Figure 27:
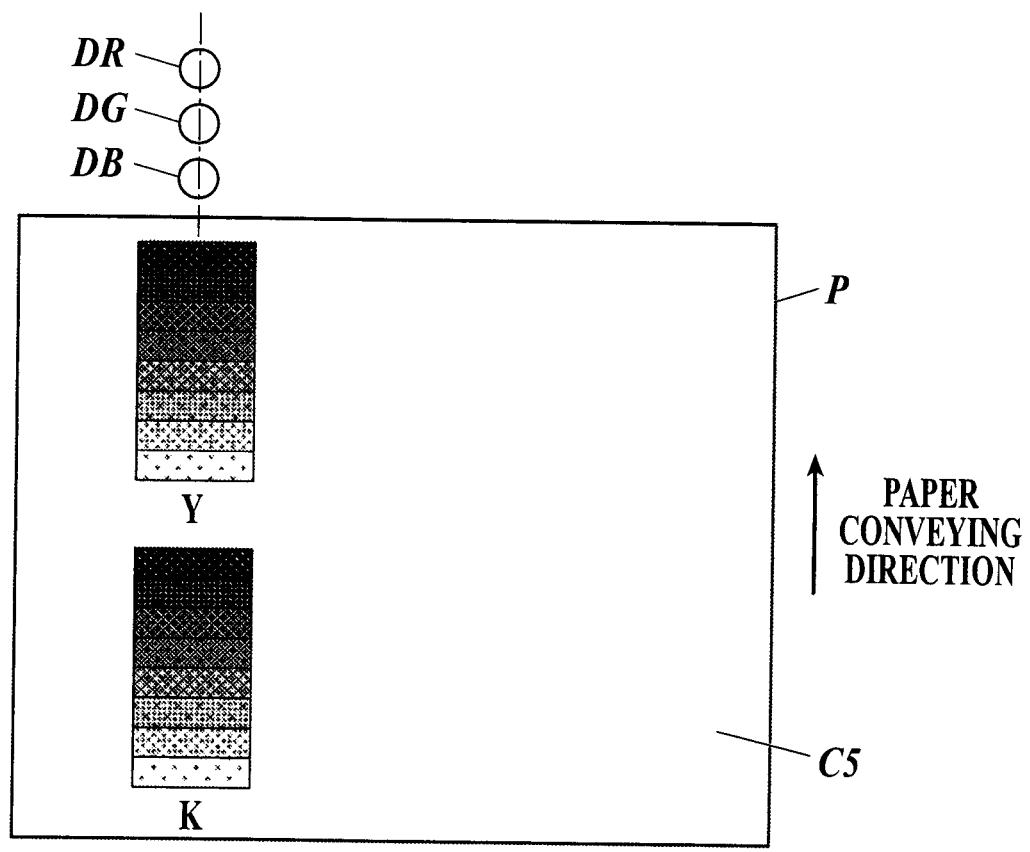
Figure 28:
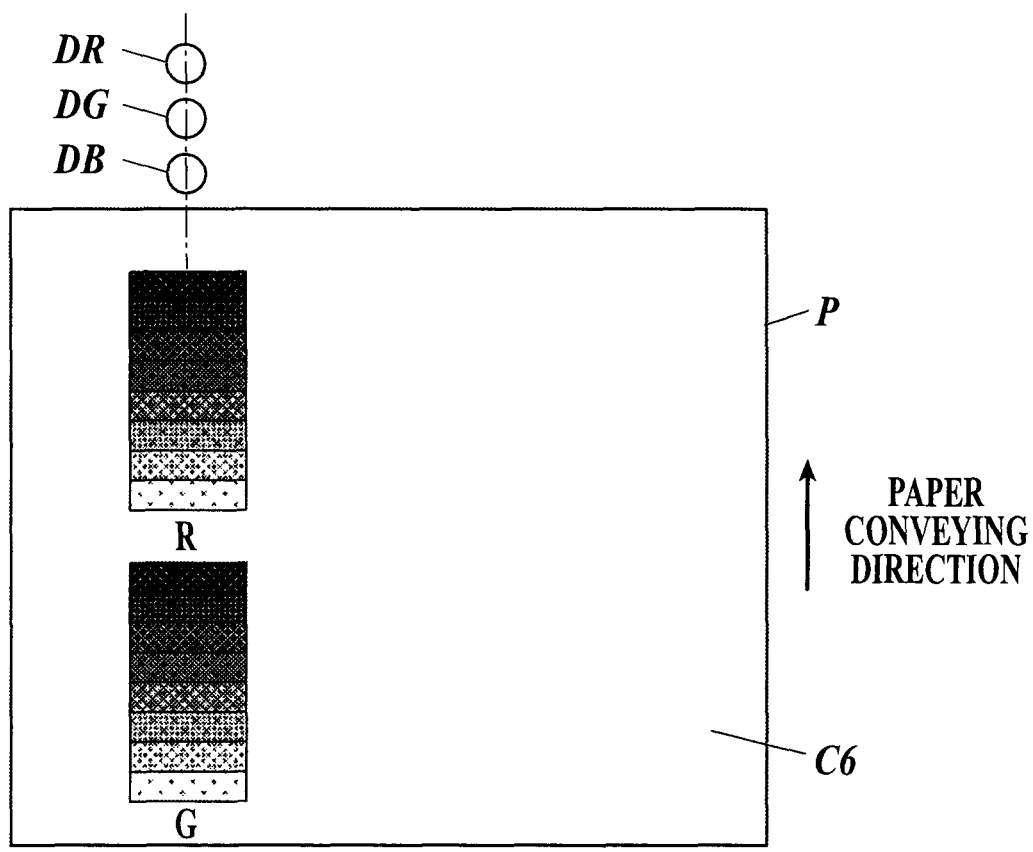
Figure 29:
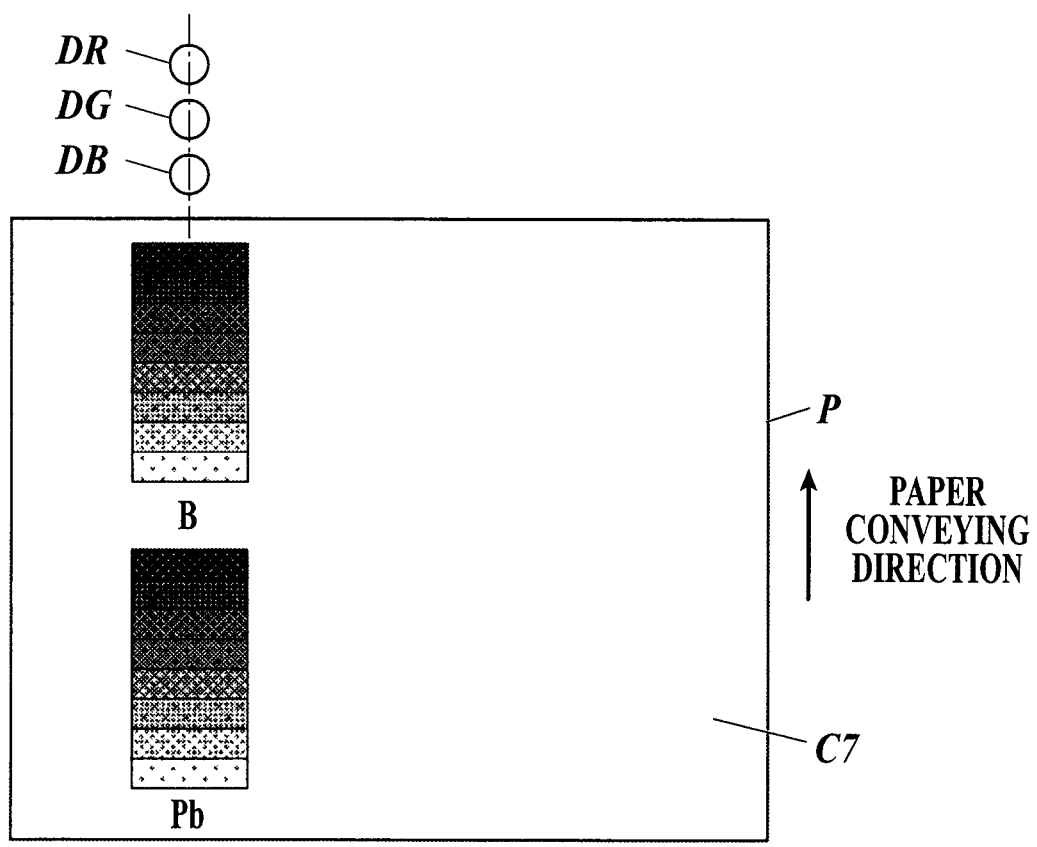

As shown in FIG. 26, the gradation pattern image piece C4 formed on a sheet of the paper P includes color patches of the colors C and M, the color patches each of which includes a plurality of gradation patches having densities (gradation values) different from each other. The range of the densities of the gradation patches is from the minimum density (gradation value 32) to the maximum density (gradation value 255), and the gradation patches of each color patch are arranged in line in the sub-scanning direction. Also, as shown in FIG. 27, the gradation pattern image piece C5 formed on a sheet of the paper P includes color patches of the colors Y and K, the color patches each of which includes a plurality of gradation patches having densities (gradation values) different from each other. The range of the densities of the gradation patches is from the minimum density (gradation value 32) to the maximum density (gradation value 255), and the gradation patches of each color patch are arranged in line in the sub-scanning direction. Furthermore, as shown in FIG. 28, the gradation pattern image piece C6 formed on a sheet of the paper P includes color patches of the colors R and G, the color patches each of which includes a plurality of gradation patches having densities (gradation values) different from each other. The range of the densities of the gradation patches is from the minimum density (gradation value 32) to the maximum density (gradation value 255), and the gradation patches of each color patch are arranged in line in the sub-scanning direction. Also, as shown in FIG. 29, the gradation pattern image piece C7 formed on the paper P includes color patches of the colors B and Pb, the color patches each of which includes a plurality of gradation patches having densities (gradation values) different from each other. The range of the densities of the gradation patches is from the minimum density (gradation value 32) to the maximum density (gradation value 255), and the gradation patches of each color patch are arranged in line in the sub-scanning direction. The configuration of each color patch, namely, the gradation values of the gradation patches of each color patch, is the same as that described in the second embodiment.

In the gradation pattern image according to the third embodiment, as shown in FIGS. 26 to 29, the color patches are formed in line in the sub-scanning direction. Therefore, as compared with the gradation pattern image according to the second embodiment, the gradation pattern image according to the third embodiment is less influenced from the non-uniformity of densities in the main-scanning direction in the image forming process performed at the image forming section 40.

In the third embodiment, the single-color density sensors 61R, 61G, and 61B are arranged parallel to the sub-scanning direction for the paper P. Accordingly, measurement positions DR, DG, and DB are also arranged parallel to the sub-scanning direction for the paper P. Therefore, the color patches of the gradation pattern image pieces C4, C5, C6, and C7 are read by the single-color density sensors 61B, 61G, and 61R in the order named.

Under the control of the control section 10, the C, M, Y, and K color patches are selectively read by the single-color density sensors 61B, 61G, and 61R. That is, the cyan color patch is read by the single-color density sensor 61R, the magenta color patch is read by the single-color density sensor 61G, the yellow color patch is read by the single-color density sensor 61B, and the black color patch is read by the single-color density sensor 61G.

Furthermore, under the control of the control section 10, each of the R, G, B, and Pb color patches is read by the single-color density sensors 61B, 61G, and 61R.

The density detection section 60 and the control section 10 make up the image density measuring apparatus 110 according to the embodiment of the present invention.

Figure 30:
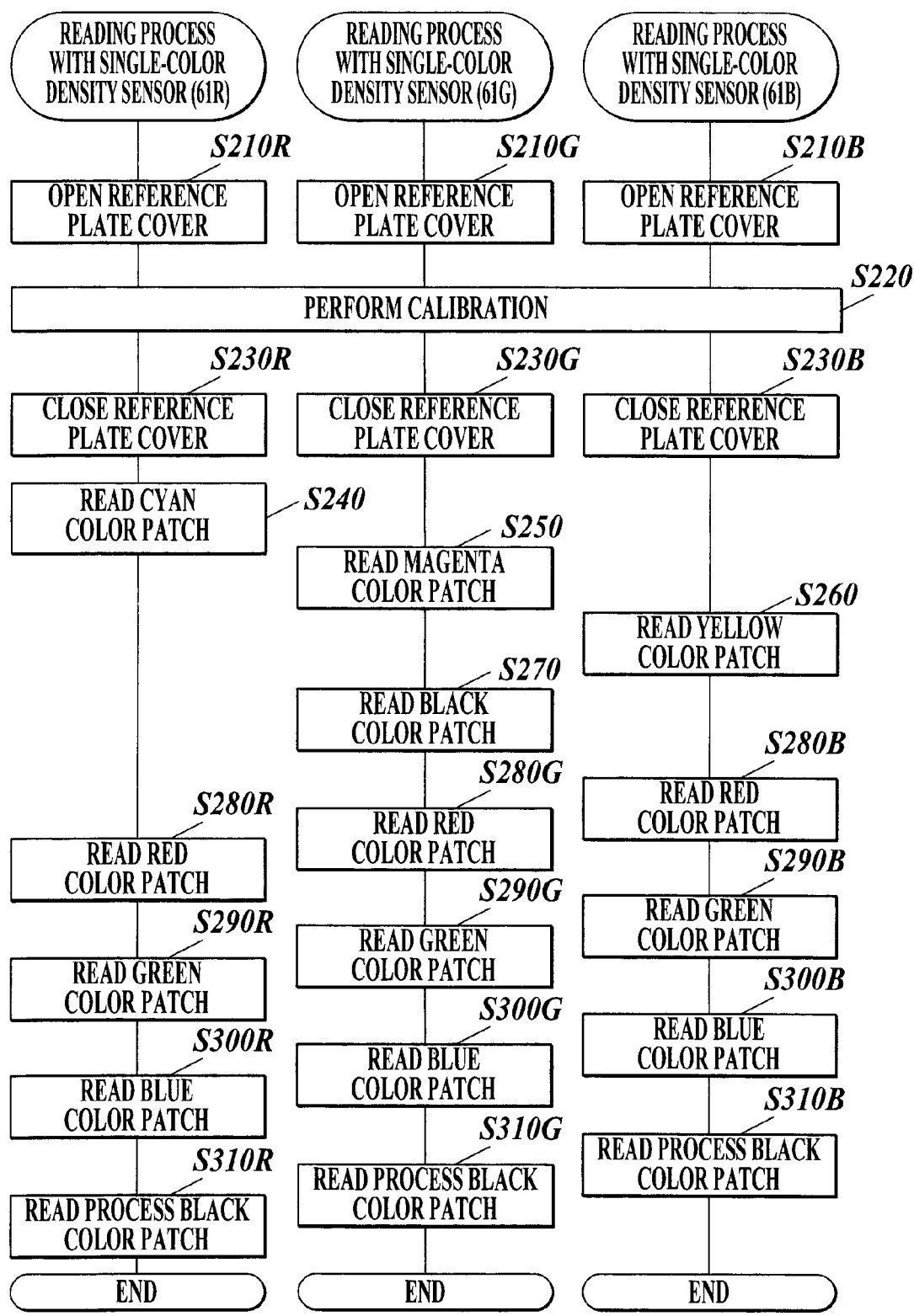
FIG. 30 is a flowchart showing steps of the gradation pattern image reading process according to the third embodiment.

Next, steps of the gradation pattern image reading process with the single-color density sensors 61B, 61G, and 61R according to the third embodiment are described, referring to FIG. 30.

First, the control section 10 moves the reference plate covers 66R, 66G, and 66B to their respective uncovering positions so that the upper surfaces of the white color reference plates 65R, 65G, and 65B are uncovered (Steps S210R, S210G, and S210B).

Next, the control section 10 calibrates the LEDs 62R, 62G, and 62B (Step S220). The control contents of the calibration are the same as those described in the second embodiment.

Next, the control section 10 moves the reference plate covers 66R, 66G, and 66B to their respective covering positions so that the upper surfaces of the white color reference plates 65R, 65G, and 65B are covered (Steps S230R, S230G, and S230B).

Next, the control section 10 allows the image forming section 40 to form the gradation pattern image pieces C4 and C5 shown in FIGS. 26 and 27 on sheets of the paper P, respectively, and allows the single-color density sensor 61R (first reading section) to start to read a cyan color patch in the way described above at the timing when the cyan color patch of the gradation pattern image piece C4 reaches the measurement position DR (Step S240).

Then, the control section 10 allows the single-color density sensor 61G (second reading section) to start to read a magenta color patch in the way described above at the timing when the magenta color patch of the gradation pattern image piece C4 reaches the measurement position DG (Step S250).

Then, the control section 10 allows the single-color density sensor 61B (third reading section) to start to read a yellow color patch in the way described above at the timing when the yellow color patch of the gradation pattern image piece C5 reaches the measurement position DB (Step S260).

Then, the control section 10 allows the single-color density sensor 61G to start to read a black color patch in the way described above at the timing when the black color patch of the gradation pattern image piece C5 reaches the measurement position DG (Step S270).

Next, the control section 10 allows the image forming section 40 to form the gradation pattern image pieces C6 and C7 shown in FIGS. 29 and 29 on sheets of the paper P, respectively, and allows the single-color density sensor 61B to start to read a red color patch in the way described above at the timing when the red color patch of the gradation pattern image piece C6 reaches the measurement position DB (Step S280B), slightly after that, allows the single-color density sensor 61G to start to read the red color patch in the way described above at the timing when the red color patch of the gradation pattern image piece C6 reaches the measurement position DG (Step S280G), and slightly after that, allows the single-color density sensor 61R to start to read the red color patch in the way described above at the timing when the red color patch of the gradation pattern image piece C6 reaches the measurement position DR (Step S280R).

Then, the control section 10 allows the single-color density sensor 61B to start to read a green color patch in the way described above at the timing when the green color patch of the gradation pattern image piece C6 reaches the measurement position DB (Step S290B), slightly after that, allows the single-color density sensor 61G to start to read the green color patch in the way described above at the timing when the green color patch of the gradation pattern image piece C6 reaches the measurement position DG (Step S290G), and slightly after that, allows the single-color density sensor 61R to start to read the green color patch in the way described above at the timing when the green color patch of the gradation pattern image piece C6 reaches the measurement position DR (Step S290R).

Then, the control section 10 allows the single-color density sensor 61B to start to read a blue color patch in the way described above at the timing when the blue color patch of the gradation pattern image piece C7 reaches the measurement position DB (Step S300B), slightly after that, allows the single-color density sensor 61G to start to read the blue color patch in the way described above at the timing when the blue color patch of the gradation pattern image piece C7 reaches the measurement position DG (Step S300G), and slightly after that, allows the single-color density sensor 61R to start to read the blue color patch in the way described above at the timing when the blue color patch of the gradation pattern image piece C7 reaches the measurement position DR (Step S300R).

Then, the control section 10 allows the single-color density sensor 61B to start to read a process black color patch in the way described above at the timing when the process black color patch of the gradation pattern image piece C7 reaches the measurement position DB (Step S310B), slightly after that, allows the single-color density sensor 61G to start to read the process black color patch in the way described above at the timing when the process black color patch of the gradation pattern image piece C7 reaches the measurement position DG (Step S310G), and slightly after that, allows the single-color density sensor 61R to start to read the process black color patch in the way described above at the timing when the process black color patch of the gradation pattern image piece C7 reaches the measurement position DR (Step S310R).

Based on the image density signals of the colors obtained by reading the color patches as described above, the control section 10 performs, for example, the averaging process and the combining process described above.

As described above, according to the first to third embodiments of the present invention, the image forming section 40 forms an image on paper by mixing n color materials, the n being a positive integer. Then, the image forming section 40 forms, on paper, a gradation pattern image including color patches each of which includes gradation patches, wherein the color patches have colors different from each other, the colors ranging from a first color constituted of one color material among the n color materials to an $n^{th}$ color constituted of the n color materials, and the gradation patches have gradations different from each other. Then, the density detection section 60 detects a reflectance of each of the gradation patches of each of the color patches included in the gradation pattern image formed on the paper, and outputs reflectance information on the detected reflectance. Then, the control section 10 creates a gamma curve for each of the colors ranging from the first color to the $n^{th}$ color based on the reflectance information on each of the gradation patches of each of the color patches, the reflectance information being outputted from the reflectance detection section, to correct a gradation of input image data in such a way as to obtain a predetermined reflectance. Thereafter, the control section 10 extracts a color composition of each of the colors ranging from the first color to the $n^{th}$ color from the input image data. On the color composition of an $m^{th}$ color, the m being 1 to n−1, the control section 10 performs a first gamma correction which corrects the gradation of the color composition of the $m^{th}$ color based on the gamma curve for the $m^{th}$ color so as to obtain a first corrected gradation value, and a second gamma correction which corrects the gradation of the color composition of the $m^{th}$ color based on the gamma curve for an $(m+1)^{th}$ color so as to obtain a second corrected gradation value, and interpolates the first corrected gradation value and the second corrected gradation value so as to determine an output value for the color composition of the $m^{th}$ color. On the color composition of the $n^{th}$ color, the control section 10 corrects the gradation of the color composition of the $n^{th}$ color based on the gamma curve for the $n^{th}$ color so as to obtain an output value for the color composition of the $n^{th}$ color. Then, the control section 10 combines the output values of the colors ranging from the first color to the $n^{th}$ color so as to generate output image data. The image forming section 40 forms an image on paper based on the output image data generated by the control section. Consequently, time to recreate color profiles and perform color adjustment becomes unnecessary, and workload can be reduced. Accordingly, images can be stabilized in a simple manner at a state where the colors thereof including the mixed colors each of which is constituted of two or more color materials are ideal. Furthermore, since the steps of the color adjustment can be performed in parallel, it reduces time necessary for stabilizing images. Furthermore, the first and second corrected gradation values interpolated, whereby more accurate image stability can be obtained.

According to the first to third embodiments, the control section 10 extracts a luminance signal based on the reflectance information outputted from the reflectance detection section, the luminance signal being a composition representing brightness. Then, the control section 10 creates, based on the extracted luminance signal, the gamma curve for a color of the colors, the color being constituted of two or more color materials among the n color materials. Accordingly, the gamma curve having high accuracy in color adjustment can be obtained.

According to the first to third embodiments, the control section 10 weights the first corrected gradation value and the second corrected gradation value in accordance with a ratio of the gradation of the color composition of the $(m+1)^{th}$ color to the gradation of the color composition of the $m^{th}$ color in interpolating the first corrected gradation value and the second corrected gradation value. Accordingly, tone jump can be prevented from occurring, and more accurate color adjustment can be performed.

According to the first to third embodiments, when the color composition of the $(m+1)^{th}$ color constituted of two or more colors including the $m^{th}$ color is not extracted from the input image data, the control section 10 corrects the gradation of the color composition of the $m^{th}$ color based on the gamma curves for the $(m+1)^{th}$ colors each of which is constituted of two or more colors including the $m^{th}$ color so as to obtain pre-second corrected gradation values, and averages the obtained pre-second corrected gradation values so as to obtain the second corrected gradation value. Accordingly, the gradation continuity can be ensured, and more accurate color adjustment can be performed.

Furthermore, since the n color materials are three toner materials of cyan, magenta, and yellow, highly accurate color adjustment can be performed in the image forming apparatus which uses the electrophotographic process.

According to the second embodiment, the image forming section 40 forms, on the paper P, the gradation pattern image including the color patches which are a cyan color patch constituted of cyan, a magenta color patch constituted of magenta, a yellow color patch constituted of yellow, and mixed color patches constituted of two or more colors among cyan, magenta, and yellow, the mixed color patches being a red color patch, a green color patch, a blue color patch and a process black color patch. Then, the single-color density sensor 61R emits red light to a color patch of the color patches, the color patch passing through the measurement position DR, receives reflected light of the red light reflected by the color patch, and outputs a signal corresponding to an amount of the received light. The single-color density sensor $61G_1$ emits green light to a color patch of the color patches, the color patch passing through the measurement position $DG_1$ different from the measurement position DR at least in the main-scanning direction for the paper P, receives reflected light of the green light reflected by the color patch, and outputs a signal corresponding to an amount of the received light. The single-color density sensor 613 emits blue light to a color patch of the color patches, the color patch passing through the measurement position DB different from the measurement positions DR and $DG_1$ at least in the main-scanning direction for the paper P, receives reflected light of the blue light reflected by the color patch, and outputs a signal corresponding to an amount of the received light. The control section 10 obtains the signals respectively outputted from the single-color density sensors 61R, $61G_1$, and 61B as the reflectance information. The image forming section 40 forms, on the paper P, the cyan color patch, the magenta color patch, and the yellow color patch in such a way as to respectively pass through the measurement positions DR, $DG_1$, and DB, and forms, on the paper, the mixed color patches which are the red color patch, the green color patch, the blue color patch, and the process black patch in such a way that each of the mixed color patches pass through the measurement positions DR, $DG_1$, and DB. The control section 10 obtains the reflectance information on the cyan color patch from the signal outputted from the single-color density sensor 61R, the reflectance information on the magenta color patch the signal outputted from the single-color density sensor $61G_1$, and the reflectance information on the yellow color patch from the signal outputted from the single-color density sensor 61B, and also obtains the reflectance information on the red color patch, the reflectance information on the green color patch, the reflectance information on the blue color patch, and the reflectance information on the process black color patch from the signals respectively outputted from the single-color density sensors 61R, $61G_1$, and 61B. Consequently, it becomes unnecessary to control or correct the amount of light in accordance with the read color patch. Accordingly, color patches of the primary, secondary, and tertiary colors can be read in a simple manner, and also a decline in the productivity, which occurs accompanying the correction of the amount of light, can be prevented.

According to the third embodiment, the image forming section 40 forms, on the paper P, the gradation pattern image including the color patches which are a cyan color patch constituted of cyan, a magenta color patch constituted of magenta, a yellow color patch constituted of yellow, and mixed color patches constituted of two or more colors among cyan, magenta, and yellow, the mixed color patches being a red color patch, a green color patch, a blue color patch and a process black color patch. Then, the single-color density sensor 61R emits red light to a color patch of the color patches, the color patch passing through the measurement position DR, receives reflected light of the red light reflected by the color patch, and outputs a signal corresponding to an amount of the received light. The single-color density sensor 61G emits green light to a color patch of the color patches, the color patch passing through the measurement position DG identical with the measurement position DR in the main-scanning direction for the paper P and different from the measurement position DR in the sub-scanning direction for the paper P, receives reflected light of the green light reflected by the color patch, and outputs a signal corresponding to an amount of the received light. The single-color density sensor 61B emits blue light to a color patch of the color patches, the color patch passing through the measurement position DB identical with the measurement positions DR and $DG_1$ in the main-scanning direction for the paper P and different from the measurement positions DR and $DG_1$ in the sub-scanning direction for the paper P, receives reflected light of the blue light reflected by the color patch, and outputs a signal corresponding to an amount of the received light. The control section 10 obtains the signals respectively outputted from the single-color density sensors 61R, 61G, and 61B as the reflectance information. The image forming section 40 forms, on the paper P, the cyan color patch, the magenta color patch, the yellow color patch, the red color patch, the green color patch, the blue color patch, and the process black patch in such a way that each of the color patches passes through the measurement positions DR, DG, and DB. The control section 10 obtains the reflectance information on the cyan color patch from the signal outputted from the single-color density sensor 61R, the reflectance information on the magenta color patch the signal outputted from the single-color density sensor 61G, and the reflectance information on the yellow color patch from the signal outputted from the single-color density sensor 61B, and also obtains the reflectance information on the red color patch, the reflectance information on the green color patch, the reflectance information on the blue color patch, and the reflectance information on the process black color patch from the signals respectively outputted from the single-color density sensors 61R, 61G, and 61B. Consequently, it becomes unnecessary to control or correct the amount of light in accordance with the read color patch. Accordingly, color patches of the primary, secondary, and tertiary colors can be read in a simple manner, and also a decline in the productivity, which occurs accompanying the correction of the amount of light, can be prevented.

According to the second and third embodiments, the single-color density sensor 61R emits red light to a color patch, receives reflected light of the red light reflected by the color patch, and outputs a signal corresponding to an amount of the received light, so as to read a cyan color patch, a red color patch, a green color patch, a blue color patch, and a process black color patch. The single-color density sensor 61$G_1$/61G emits green light to a color patch, receives reflected light of the green light reflected by the color patch, and outputs a signal corresponding to an amount of the received light, so as to read a magenta color patch, the red color patch, the green color patch, the blue color patch, and the process black color patch. The single-color density sensor 61B emits blue light to a color patch, receives reflected light of the blue light reflected by the color patch, and outputs a signal corresponding to an amount of the received light, so as to read a yellow color patch, the red color patch, the green color patch, the blue color patch, and the process black color patch. The control section 10 obtains reflectance information on each of the color patches from the signals respectively outputted from the single-color density sensors 61R, 61$G_1$/61G, and 61B. The single-color density sensors 61R, 61$G_1$/61G, and 61B read the color patches at positions different from each other. Consequently, it becomes unnecessary to control or correct the amount of light in accordance with the read color patch. Accordingly, color patches of the primary, secondary, and tertiary colors can be read in a simple manner, and also a decline in the productivity, which occurs accompanying the correction of the amount of light, can be prevented.

The embodiments described above are examples of the image forming apparatus of the present invention, and the scope of the present invention is not limited to the embodiments. The detailed configurations and detailed operations of the sections and the like of the image forming apparatus can be appropriately modified.

In the embodiments, as the color materials used for the mixed colors, the toner materials of three colors, cyan, magenta, and yellow, are used. However, the color materials used for the mixed colors may be two color materials or four or more color materials. When the number of the color materials used for the mixed colors is n, the gamma curve is prepared for each of the primary to the $n^{th}$ colors. When the gamma correction is performed on the $m^{th}$ color composition, the m being 1 to n−1, the gamma value obtained by using the gamma curve for the $m^{th}$ color and the gamma value obtained by using the gamma curve for the $(m+1)^{th}$ color which is constituted of colors including the $m^{th}$ color are interpolated.

In the embodiments, as the intermediate signal used for determining the gamma value of each of R, G, B, and Pb, the luminance signal (Y) is used. However, the gamma value may be determined by using another signal such as the color difference signal (Cr/Cb).

In the embodiments, when the gamma correction is performed on the primary/secondary color, the weighting of the interpolation is carried out by the ratio of the secondary/tertiary color composition value to the primary/secondary color composition value. However, the weighting ratio may be optionally set, or the weighting may be omitted.

In the second and third embodiments, when the single-color density sensors are respectively provided with the LEDs, or each time a gradation pattern image is read, a gradation image of neutral grey may be read by the single-color density sensors. From the output voltage values therefrom, output characteristics of the single-color density sensors may be obtained, and, based on the obtained output characteristics, the LEDs may be adjusted in such a way that the output voltage values therefrom become equal to each other when the gradation image of neutral grey is read by the single-color density sensors. The adjustment may be performed in addition to the above-described calibration, or instead of the calibration.

Figure 32:
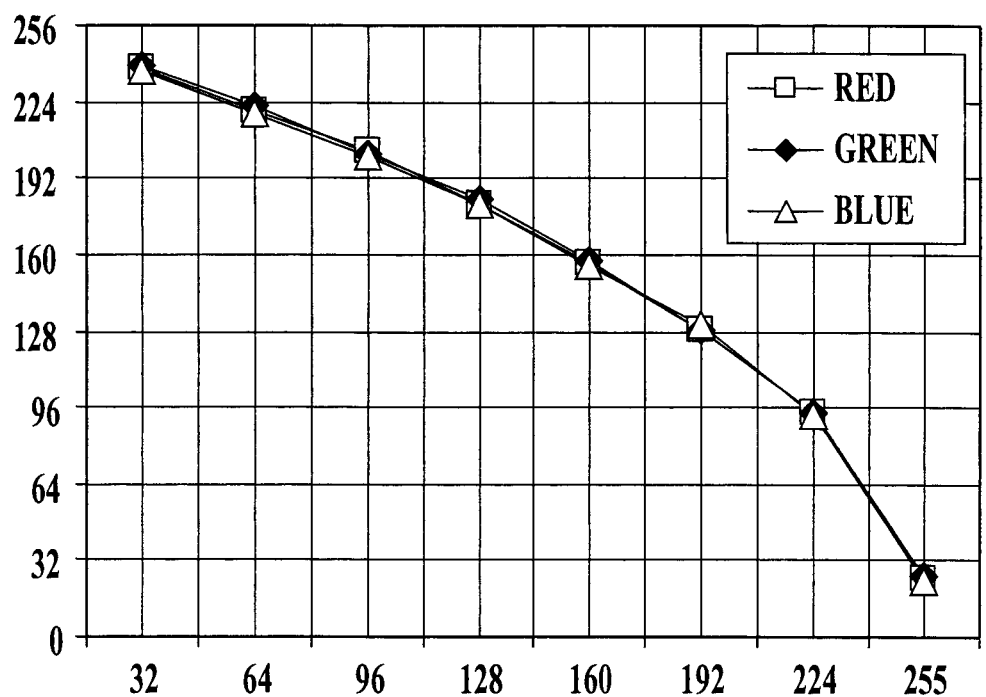
FIG. 32 is a graph for explaining the relationship between the input gradations of neutral grey and the output values of the single-color density sensors.

For example, FIG. 31 shows output values determined from voltage values which are respectively obtained and outputted by the single-color density sensors reading the gradation image of neutral grey, the single-color density sensors which respectively include red, green, and blue light sources. Neutral grey is a grey color, for example, expressed on the L* axis or in the vicinity thereof in the L*a*b color system. Furthermore, in FIG. 31, the output values shown for the red, green, and blue light sources are values determined based on the output voltage values. Each output value is obtained by setting an ROI (Region of Interest) to each gradation patch of the gradation image, reading the gradation patch in the set ROI a plurality of times, and averaging the values obtained thereby. FIG. 32 is a graph obtained by plotting the output values of the single-color density sensors, the output values which are shown in FIG. 31. In FIG. 32, the x axis indicates input gradations of neutral grey, and the y axis indicates the output values of the single-color density sensors.

As described above, when the gradation image of neutral grey is read, it is preferable that the gain adjustment be performed on each of the single-color density sensors in such a way that the output values determined from the voltage values outputted from the single-color density sensors are almost equal to each other at any of the input gradations.

In the embodiments, as a computer readable medium for the programs of the present invention, a hard disk or a non-volatile memory such as a semiconductor is used. However, this is not a limit, and a portable recoding medium such as a CD-ROM may be used instead. Furthermore, as a medium to provide data of the programs of the present invention via a communication line, a carrier wave may be used.

The entire disclosure of Japanese Patent Applications No. 2010-193148 and No. 2010-193150, both filed on Aug. 31, 2010, including the descriptions, claims, drawings, and abstracts, is incorporated herein by reference in its entirety.

What is claimed is:

1. An image forming apparatus comprising:
   an image forming section which forms an image on paper by mixing n color materials, the n being a positive integer, and which forms, on paper, a gradation pattern image including color patches each of which includes gradation patches, wherein the color patches have colors different from each other, the colors ranging from a first color constituted of one color material among the n color materials to an $n^{th}$ color constituted of the n color materials, and the gradation patches have gradations different from each other;

a reflectance detection section which detects a reflectance of each of the gradation patches of each of the color patches included in the gradation pattern image formed on the paper, and outputs reflectance information on the detected reflectance; and a control section which creates a gamma curve for each of the colors ranging from the first color to the $n^{th}$ color based on the reflectance information on each of the gradation patches of each of the color patches, the reflectance information being outputted from the reflectance detection section, to correct a gradation of input image data in such a way as to obtain a predetermined reflectance, wherein the control section (i) extracts a color composition of each of the colors ranging from the first color to the $n^{th}$ color from the input image data, (ii) on the color composition of an $m^{th}$ color, the m being 1 to n−1, performs a first gamma correction which corrects the gradation of the color composition of the $m^{th}$ color based on the gamma curve for the $m^{th}$ color so as to obtain a first corrected gradation value, and a second gamma correction which corrects the gradation of the color composition of the $m^{th}$ color based on the gamma curve for an $(m+1)^{th}$ color so as to obtain a second corrected gradation value, and interpolates the first corrected gradation value and the second corrected gradation value so as to determine an output value for the color composition of the $m^{th}$ color, (iii) on the color composition of the $n^{th}$ color, corrects the gradation of the color composition of the $n^{th}$ color based on the gamma curve for the $n^{th}$ color so as to obtain an output value for the color composition of the $n^{th}$ color, and (iv) combines the output values of the colors ranging from the first color to the $n^{th}$ color so as to generate output image data, and the image forming section forms an image on paper based on the output image data generated by the control section.

2. The image forming apparatus according to claim 1, wherein the control section extracts a luminance signal based on the reflectance information outputted from the reflectance detection section, the luminance signal being a composition representing brightness, and creates, based on the extracted luminance signal, the gamma curve for a color of the colors, the color being constituted of two or more color materials among the n color materials.

3. The image forming apparatus according to claim 1, wherein the control section weights the first corrected gradation value and the second corrected gradation value in accordance with a ratio of the gradation of the color composition of the $(m+1)^{th}$ color to the gradation of the color composition of the $m^{th}$ color in interpolating the first corrected gradation value and the second corrected gradation value.

4. The image forming apparatus according to claim 1, wherein when the color composition of the $(m+1)^{th}$ color constituted of two or more colors including the $m^{th}$ color is not extracted from the input image data, the control section corrects the gradation of the color composition of the $m^{th}$ color based on the gamma curves for the $(m+1)^{th}$ colors each of which is constituted of two or more colors including the $m^{th}$ color so as to obtain pre-second corrected gradation values, and averages the obtained pre-second corrected gradation values so as to obtain the second corrected gradation value.

5. The image forming apparatus according to claim 1, wherein the n color materials are three toner materials of cyan, magenta, and yellow.

6. The image forming apparatus according to claim 5, wherein the image forming section forms, on the paper, the gradation pattern image including the color patches which are a cyan color patch constituted of cyan, a magenta color patch constituted of magenta, a yellow color patch constituted of yellow, and a mixed color patch constituted of two or more colors among cyan, magenta, and yellow, the reflectance detection section includes:
  a first reading section which emits red light to a color patch of the color patches, the color patch passing through a first reading position, receives reflected light of the red light reflected by the color patch, and outputs a first signal corresponding to an amount of the received light;
  a second reading section which emits green light to a color patch of the color patches, the color patch passing through a second reading position different from the first reading position at least in a main-scanning direction for the paper, receives reflected light of the green light reflected by the color patch, and outputs a second signal corresponding to an amount of the received light; and
  a third reading section which emits blue light to a color patch of the color patches, the color patch passing through a third reading position different from the first reading position and the second reading position at least in the main-scanning direction for the paper, receives reflected light of the blue light reflected by the color patch, and outputs a third signal corresponding to an amount of the received light, the control section obtains the first signal, the second signal, and the third signal respectively outputted from the first reading section, the second reading section, and the third reading section as the reflectance information, the image forming section forms, on the paper, the cyan color patch, the magenta color patch, and the yellow color patch in such a way as to respectively pass through the first reading position, the second reading position, and the third reading position, and forms, on the paper, the mixed color patch in such a way as to pass through the first reading position, the second reading position, and the third reading position, and the control section obtains the reflectance information on the cyan color patch from the first signal outputted from the first reading section, the reflectance information on the magenta color patch from the second signal outputted from the second reading section, the reflectance information on the yellow color patch from the third signal outputted from the third reading section, and the reflectance information on the mixed color patch from the first signal, the second signal, and the third signal respectively outputted from the first reading section, the second reading section, and the third reading section.

7. The image forming apparatus according to claim 5, wherein the image forming section forms, on the paper, the gradation pattern image including the color patches which are a cyan color patch constituted of cyan, a magenta color patch constituted of magenta, a yellow color patch constituted of yellow, and a mixed color patch constituted of two or more colors among cyan, magenta, and yellow, the reflectance detection section includes:
  a first reading section which emits red light to a color patch of the color patches, the color patch passing through a first reading position, receives reflected light of the red light reflected by the color patch, and outputs a first signal corresponding to an amount of the received light;

a second reading section which emits green light to a color patch of the color patches, the color patch passing through a second reading position identical with the first reading position in a main-scanning direction for the paper and different from the first reading position in a sub-scanning direction for the paper, receives reflected light of the green light reflected by the color patch, and outputs a second signal corresponding to an amount of the received light; and a third reading section which emits blue light to a color patch of the color patches, the color patch passing through a third reading position identical with the first reading position and the second reading position in the main-scanning direction for the paper and different from the first reading position and the second reading position in the sub-scanning direction for the paper, receives reflected light of the blue light reflected by the color patch, and outputs a third signal corresponding to an amount of the received light, the control section obtains the first signal, the second signal, and the third signal respectively outputted from the first reading section, the second reading section, and the third reading section as the reflectance information, the image forming section forms, on the paper, the cyan color patch, the magenta color patch, the yellow color patch, and the mixed color patch in such a way that each of the color patches passes through the first reading position, the second reading position, and the third reading position, and the control section obtains the reflectance information on the cyan color patch from the first signal outputted from the first reading section, the reflectance information on the magenta color patch from the second signal outputted from the second reading section, the reflectance information on the yellow color patch from the third signal outputted from the third reading section, and the reflectance information on the mixed color patch from the first signal, the second signal, and the third signal respectively outputted from the first reading section, the second reading section, and the third reading section.

8. An image forming method comprising:

forming an image on paper by mixing n color materials, the n being a positive integer, and forming, on paper, a gradation pattern image including color patches each of which includes gradation patches, wherein the color patches have colors different from each other, the colors ranging from a first color constituted of one color material among the n color materials to an $n^{th}$ color constituted of the n color materials, and the gradation patches have gradations different from each other;

detecting a reflectance of each of the gradation patches of each of the color patches included in the gradation pattern image formed on the paper, and obtaining reflectance information on the detected reflectance; and creating a gamma curve for each of the colors ranging from the first color to the $n^{th}$ color based on the reflectance information on each of the gradation patches of each of the color patches, the reflectance information being outputted from the reflectance detection section, to correct a gradation of input image data in such a way as to obtain a predetermined reflectance, wherein in the creating, (i) a color composition of each of the colors ranging from the first color to the $n^{th}$ color is extracted from the input image data, (ii) on the color composition of an $m^{th}$ color, the m being 1 to n−1, a first gamma correction and a second gamma correction are performed, the first gamma correction which corrects the gradation of the color composition of the $m^{th}$ color based on the gamma curve for the $m^{th}$ color so as to obtain a first corrected gradation value, and the second gamma correction which corrects the gradation of the color composition of the $m^{th}$ color based on the gamma curve for an $(m+1)^{th}$ color so as to obtain a second corrected gradation value, and the first corrected gradation value and the second corrected gradation value are interpolated so as to determine an output value for the color composition of the $m^{th}$ color, (iii) on the color composition of the $n^{th}$ color, the gradation of the color composition of the $n^{th}$ color is corrected based on the gamma curve for the $n^{th}$ color so as to obtain an output value for the color composition of the $n^{th}$ color, and (iv) the output values of the colors ranging from the first color to the $n^{th}$ color are combined so as to generate output image data, and in the forming, an image is formed on paper based on the output image data generated in the creating.

9. The image forming method according to claim 8, wherein, in the creating, a luminance signal is extracted based on the reflectance information obtained in the detecting, the luminance signal being a composition representing brightness, and, based on the extracted luminance signal, the gamma curve for a color of the colors is created, the color being constituted of two or more color materials among the n color materials.

10. The image forming method according to claim 8, wherein, in the creating, the first corrected gradation value and the second corrected gradation value are weighted in accordance with a ratio of the gradation of the color composition of the $(m+1)^{th}$ color to the gradation of the color composition of the $m^{th}$ color in interpolating the first corrected gradation value and the second corrected gradation value.

11. The image forming method according to claim 8, wherein, in the creating, when the color composition of the $(m+1)^{th}$ color constituted of two or more colors including the $m^{th}$ color is not extracted from the input image data, the gradation of the color composition of the $m^{th}$ color is corrected based on the gamma curves for the $(m+1)^{th}$ colors each of which is constituted of two or more colors including the $m^{th}$ color so as to obtain pre-second corrected gradation values, and the obtained pre-second corrected gradation values are averaged so as to obtain the second corrected gradation value.

12. The image forming method according to claim 8, wherein the n color materials are three toner materials of cyan, magenta, and yellow.

13. The image forming method according to claim 12, wherein, in the creating, the gradation pattern image is formed on the paper, the gradation pattern image including the color patches which are a cyan color patch constituted of cyan, a magenta color patch constituted of magenta, a yellow color patch constituted of yellow, and a mixed color patch constituted of two or more colors among cyan, magenta, and yellow, the detecting includes:

a first reading in which red light is emitted to a color patch of the color patches, the color patch passing through a first reading position, reflected light of the red light reflected by the color patch is received, and a first signal corresponding to an amount of the received light is obtained;

a second reading in which green light is emitted to a color patch of the color patches, the color patch passing through a second reading position different from the first reading position at least in a main-scanning direction for the paper, reflected light of the green light reflected by the color patch is received, and a second signal corresponding to an amount of the received light is obtained; and a third reading in which blue light is emitted to a color patch of the color patches, the color patch passing through a third reading position different from the first reading position and the second reading position at least in the main-scanning direction for the paper, reflected light of the blue light reflected by the color patch is received, and a third signal corresponding to an amount of the received light is obtained, in the creating, the first signal, the second signal, and the third signal respectively obtained in the first reading, the second reading, and the third reading are obtained as the reflectance information, in the forming, the cyan color patch, the magenta color patch, and the yellow color patch are formed on the paper in such a way as to respectively pass through the first reading position, the second reading position, and the third reading position, and the mixed color patch is formed on the paper in such a way as to pass through the first reading position, the second reading position, and the third reading position, and in the creating, the reflectance information on the cyan color patch is obtained from the first signal obtained in the first reading, the reflectance information on the magenta color patch is obtained from the second signal obtained in the second reading, the reflectance information on the yellow color patch is obtained from the third signal obtained in the third reading, and the reflectance information on the mixed color patch is obtained from the first signal, the second signal, and the third signal respectively obtained in the first reading, the second reading, and the third reading.

14. The image forming method according to claim 12, wherein in the forming, the gradation pattern image is formed on the paper, the gradation pattern image including the color patches which are a cyan color patch constituted of cyan, a magenta color patch constituted of magenta, a yellow color patch constituted of yellow, and a mixed color patch constituted of two or more colors among cyan, magenta, and yellow, the detecting includes:

a first reading in which red light is emitted to a color patch of the color patches, the color patch passing through a first reading position, reflected light of the red light reflected by the color patch is received, and a first signal corresponding to an amount of the received light is obtained;

a second reading in which green light is emitted to a color patch of the color patches, the color patch passing through a second reading position identical with the first reading position in a main-scanning direction for the paper and different from the first reading position in a sub-scanning direction for the paper, reflected light of the green light reflected by the color patch is received, and a second signal corresponding to an amount of the received light is obtained; and a third reading in which blue light is emitted to a color patch of the color patches, the color patch passing through a third reading position identical with the first reading position and the second reading position in the main-scanning direction for the paper and different from the first reading position and the second reading position in the sub-scanning direction for the paper, reflected light of the blue light reflected by the color patch is received, and a third signal corresponding to an amount of the received light is obtained, in the creating, the first signal, the second signal, and the third signal respectively obtained in the first reading, the second reading, and the third reading are obtained as the reflectance information, in the forming, the cyan color patch, the magenta color patch, the yellow color patch, and the mixed color patch are formed on the paper in such a way that each of the color patches passes through the first reading position, the second reading position, and the third reading position, and in the creating, the reflectance information on the cyan color patch is obtained from the first signal obtained in the first reading, the reflectance information on the magenta color patch is obtained from the second signal obtained in the second reading, the reflectance information on the yellow color patch is obtained from the third signal obtained in the third reading, and the reflectance information on the mixed color patch is obtained from the first signal, the second signal, and the third signal respectively obtained in the first reading, the second reading, and the third reading.

* * * * *